US008245232B2

(12) United States Patent
Mutlu et al.

(10) Patent No.: US 8,245,232 B2
(45) Date of Patent: Aug. 14, 2012

(54) SOFTWARE-CONFIGURABLE AND STALL-TIME FAIR MEMORY ACCESS SCHEDULING MECHANISM FOR SHARED MEMORY SYSTEMS

(75) Inventors: Onur Mutlu, Kirkland, WA (US); Thomas Moscibroda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 12/042,359

(22) Filed: Mar. 5, 2008

(65) Prior Publication Data
US 2009/0138670 A1    May 28, 2009

Related U.S. Application Data

(60) Provisional application No. 60/990,357, filed on Nov. 27, 2007.

(51) Int. Cl.
*G06F 9/46* (2006.01)
*G06F 9/48* (2006.01)

(52) U.S. Cl. ......... 718/103; 718/102; 718/105; 712/214

(58) Field of Classification Search ................... 718/102, 718/103, 105; 712/214
See application file for complete search history.

(56) References Cited

U.S. PATENT DOCUMENTS

| | | | | |
|---|---|---|---|---|
| 5,546,543 A | * | 8/1996 | Yang et al. | 709/235 |
| 5,805,595 A | * | 9/1998 | Sharper et al. | 370/442 |
| 5,898,687 A | * | 4/1999 | Harriman et al. | 370/390 |
| 6,185,654 B1 | * | 2/2001 | Van Doren | 711/5 |
| 6,430,640 B1 | * | 8/2002 | Lim | 710/200 |
| 6,909,691 B1 | | 6/2005 | Goyal et al. | |
| 7,076,609 B2 | | 7/2006 | Garg et al. | |
| 7,093,109 B1 | | 8/2006 | Davis et al. | |
| 7,143,401 B2 | | 11/2006 | Babaian et al. | |
| 7,174,437 B2 | * | 2/2007 | Kaczynski | 711/158 |

(Continued)

FOREIGN PATENT DOCUMENTS

JP          04335457 A     *  11/1992

OTHER PUBLICATIONS

Axexandra Fedorova, et al. CASC: A Cache-Aware Scheduling Algorithm for Multithreaded Chip Multiprocessors http://research.sun.com/scalable/pubs/CASC.pdf. Last accessed Nov. 12, 2007, 15 pages.

(Continued)

*Primary Examiner* — Aimee Li
(74) *Attorney, Agent, or Firm* — The Law Office of Michael E. Kondoudis

(57) ABSTRACT

Systems and methodologies for stall-time fair memory access scheduling for shared memory systems are provided herein. A stall-time fairness policy can be applied in accordance with various aspects described herein to schedule memory requests from threads sharing a memory system. To this end, a Stall-Time Fair Memory scheduler (STFM) algorithm can be utilized, wherein memory-related slowdown experienced by a group of threads due to interference from other threads is equalized. Additionally and/or alternatively, a traditional scheduling policy such as first-ready first-come-first-serve (FR-FCFS) can be utilized in combination with a cap on column-over-row reordering of memory requests, thereby reducing the amount of stall-time unfairness imposed by such traditional scheduling policies. Further, various aspects described herein can perform memory scheduling based on thread weights and/or other parameters, which can be configured in hardware and/or software.

19 Claims, 16 Drawing Sheets

U.S. PATENT DOCUMENTS

| | | | |
|---|---|---|---|
| 7,689,773 B2 * | 3/2010 | Fedorova | 711/130 |
| 2005/0047425 A1 * | 3/2005 | Liu et al. | 370/411 |
| 2005/0210471 A1 | 9/2005 | Okawara | |
| 2006/0005082 A1 | 1/2006 | Fossum et al. | |
| 2006/0179196 A1 | 8/2006 | Gray | |
| 2006/0248261 A1 | 11/2006 | Jacob et al. | |
| 2007/0028056 A1 | 2/2007 | Harris | |
| 2007/0150895 A1 | 6/2007 | Kurland | |
| 2008/0059712 A1 * | 3/2008 | Fedorova | 711/130 |
| 2008/0134185 A1 * | 6/2008 | Fedorova | 718/102 |

OTHER PUBLICATIONS

Axexandra Fedorova. Operating System Scheduling for Chip Multithreaded Processors, PhD Thesis, Sep. 2006 http://www.eecs.harvard.edu/~fedorova/thesis.pdf. Last accessed Nov. 12, 2007, 199 pages.

Jichuan Chang. Cooperative Caching for Chip Multiprocessors. PhD Thesis. ftp://ftp.cs.wisc.edu/sohi/theses/chang.pdf. Last accessed Nov. 12, 2007, 160 pages.

* cited by examiner

SOFTWARE-CONFIGURABLE AND STALL-TIME FAIR MEMORY ACCESS SCHEDULING MECHANISM FOR SHARED MEMORY SYSTEMS

CROSS REFERENCE

This application claims the benefit of U.S. Provisional Patent Application Ser. No. 60/990,357, filed on Nov. 27, 2007, entitled "A SOFTWARE-CONFIGURABLE AND STALL-TIME FAIR MEMORY ACCESS SCHEDULING MECHANISM FOR SHARED MEMORY SYSTEMS," the entirety of which is incorporated herein by reference.

BACKGROUND

Recent advances in computer technology have greatly increased the speed at which computing tasks can be performed. For example, many processing units in computing devices now utilize Chip Multiprocessor (CMP) systems, which allow multiple threads of execution to execute simultaneously on a single chip. A CMP system generally comprises multiple independent processing cores, each of which can share common resources such as Dynamic Random Access Memory (DRAM) for executing respective threads.

However, such a resource sharing scheme poses significant resource managing problems in designing CMP systems. For example, different threads executed by a CMP system can interfere with each other while accessing shared memory resources. Conventional memory access scheduling techniques for CMP systems function by optimizing overall data throughput obtained from the DRAM. However, in doing so, such techniques do not take into account inter-thread interference. As a result, different threads running together on the same chip can experience significantly different memory system performance. For example, one thread can experience a severe slowdown or starvation while another is unfairly prioritized by the memory scheduler. Accordingly, there is a need in the art for memory access scheduling techniques that provide more effective balancing of memory system performance between threads in a CMP system.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Systems and methodologies are provided herein that provide improved memory access scheduling for a shared memory system. For example, a scheduling component in accordance with various aspects described herein can implement a stall-time fairness policy to schedule different threads sharing a memory system. In accordance with one aspect, a Stall-Time Fair Memory scheduler (STFM) algorithm can be utilized to equalize DRAM-related slowdown experienced by a group of threads due to interference from other threads without hurting overall system performance. In accordance with another aspect, a memory scheduler can utilize one or more conventional memory scheduling policies such as first-ready first-come-first-serve (FR-FCFS) in combination with a cap on column-over-row reordering of memory requests, thereby reducing the amount of stall-time unfairness imposed by such traditional scheduling policies.

In general, STFM, cap-based memory scheduling, and/or other mechanisms described herein can take into account inherent memory characteristics of a group of threads and refrain from unfairly penalizing threads that use the DRAM system without interfering with other threads. By doing so, various memory access scheduling mechanisms described herein can significantly reduce unfairness in a DRAM system while also improving system throughput (e.g., weighted speedup of threads) on a wide variety of workloads and systems.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
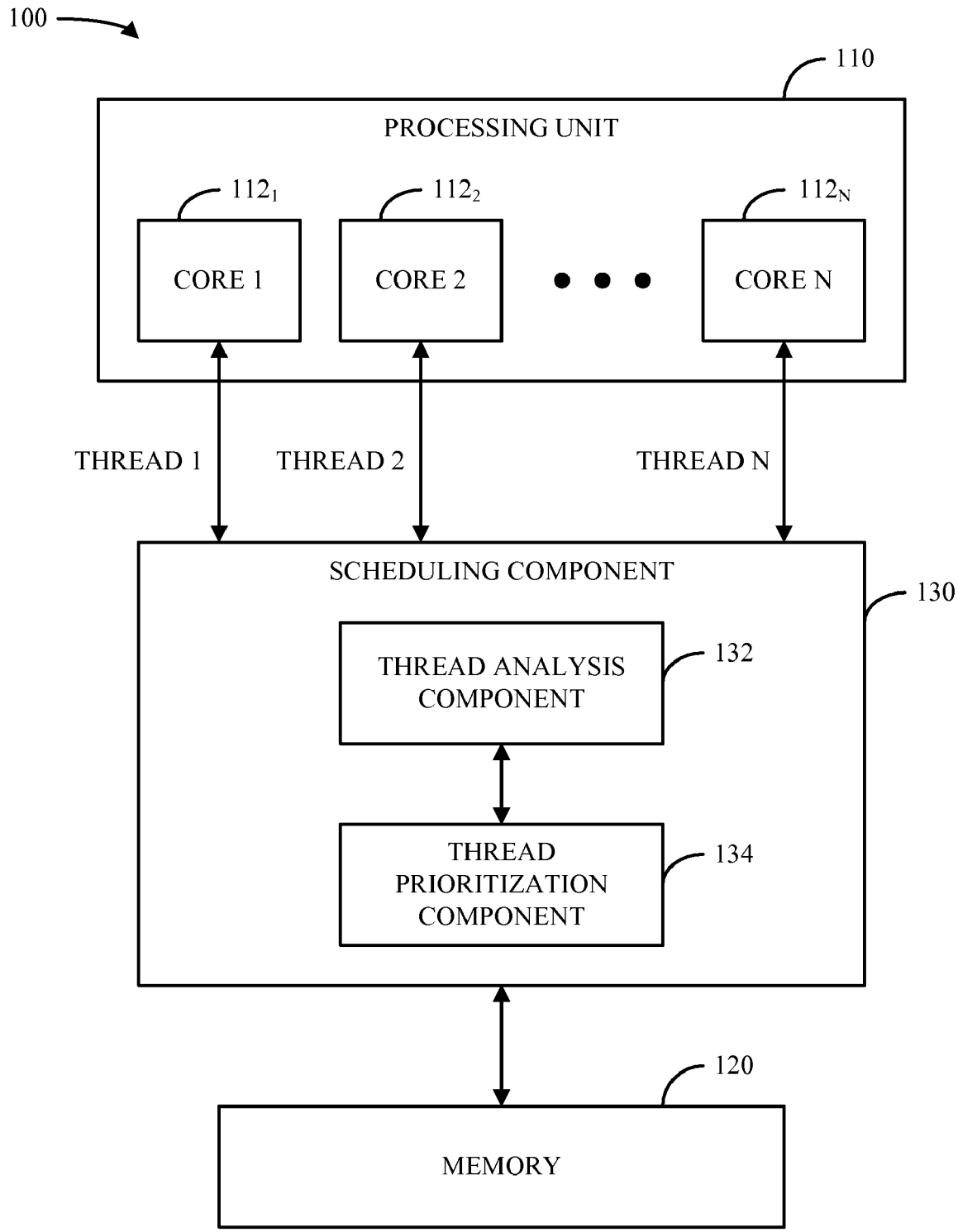
FIG. 1 is a high-level block diagram of a system for stall-time fair memory access scheduling for a shared memory system in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," "interface," "schema," "algorithm," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawings, FIG. 1 illustrates a block diagram of a system 100 for stall-time fair memory access scheduling for a shared memory system in accordance with various aspects described herein. System 100 can include a processing unit 110, which in one specific example can implement a chip multiprocessor (CMP) system for enabling multiple threads to be executed simultaneously on a single semiconductor chip. In accordance with one aspect, a CMP system implemented at processing unit 110 can include multiple independent processing cores 112 that share parts of a memory subsystem 120. In one example, this multiple-core chip organization can yield benefit in terms of power-efficiency, scalability, and system throughput compared to a single-core system. On the other hand, however, shared hardware resources can also pose significant resource management problems in designing CMP systems. For example, different threads can interfere with each other while accessing shared resources. If inter-thread interference is not controlled, some threads can be unfairly prioritized over others while other threads having potentially higher priorities can be starved for long periods of time while waiting to access shared resources.

In particular, there are at least four major problems caused by unfair resource sharing in a CMP system. First, unfair resource sharing can render priority-based thread scheduling policies given by software (e.g. an operating system, a virtual machine, etc.) ineffective. As a result, significant discomfort can be caused to an end user who naturally expects threads with higher (or equal) priorities to get greater (or equal) shares of the performance provided by the computing system. Second, malicious programs that intentionally deny service to other threads can be devised by exploiting unfairness in a resource sharing scheme, which can result in significant productivity loss and degradation in system performance. Third, unfairness can reduce the performance predictability of applications, since the performance of an application becomes increasingly dependent on the characteristics of other applications running on other cores as unfairness increases. As a result, it can be difficult to analyze and optimize system performance in a CMP system. Fourth, in commercial grid computing systems or other systems where users are charged for central processing unit (CPU) hours, unfair resource sharing can result in unfair billing procedures. For example, the performance a user program experiences may not necessarily correlate with required CPU hours due to the fact that the required number of CPU hours may be dependent on other programs running on the CMP system.

As the number of processing cores 112 associated with a processing unit 110 increases, the pressure on shared hardware resources increases and inter-thread interference in shared resources becomes an even more severe problem. As a result, there is an increasing need for techniques to provide quality of service (or fairness) to threads sharing CMP resources.

In accordance with one aspect, one or more cores 112 within processing unit 110 can share common computing resources such as, for example, memory 120. By way of specific example, memory 120 can be a Dynamic Random Access Memory (DRAM) memory subsystem. In many CMP systems, a DRAM memory subsystem is a major resource shared between processing cores. However, conventional high-performance DRAM memory controller designs do not take into account interference between different threads when making scheduling decisions. Instead, conventional controller designs generally attempt to maximize data throughput obtained from the DRAM by using a first-ready first-come-first-serve (FR-FCFS) policy. FR-FCFS prioritizes memory requests that hit in the row-buffers of DRAM banks over other requests, including older ones. If no request is a row-buffer hit, then FR-FCFS prioritizes older requests over younger ones. This scheduling algorithm is thread-unaware. Therefore, different threads running together on the same chip can experience significantly different memory system performance. For example, one thread (e.g., a thread with a very low row-buffer hit rate) can experience a severe slowdown or starvation, while another (e.g., a thread with a very high row-buffer hit rate) can be unfairly prioritized by the memory scheduler.

Figure 2:
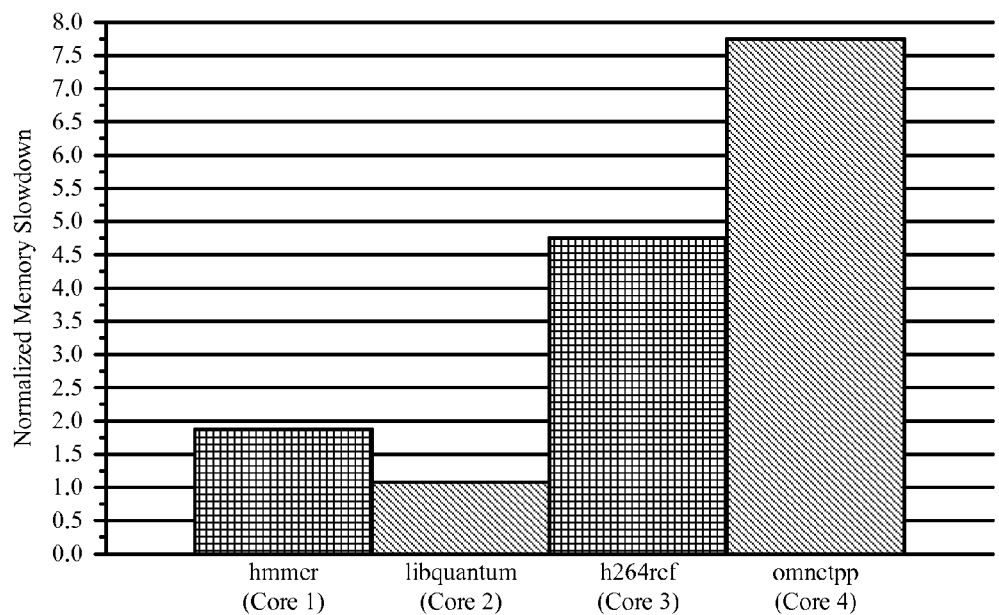
FIG. 2 illustrates example memory stall time data for a series of threads operating in a shared memory system.
Figure 2:
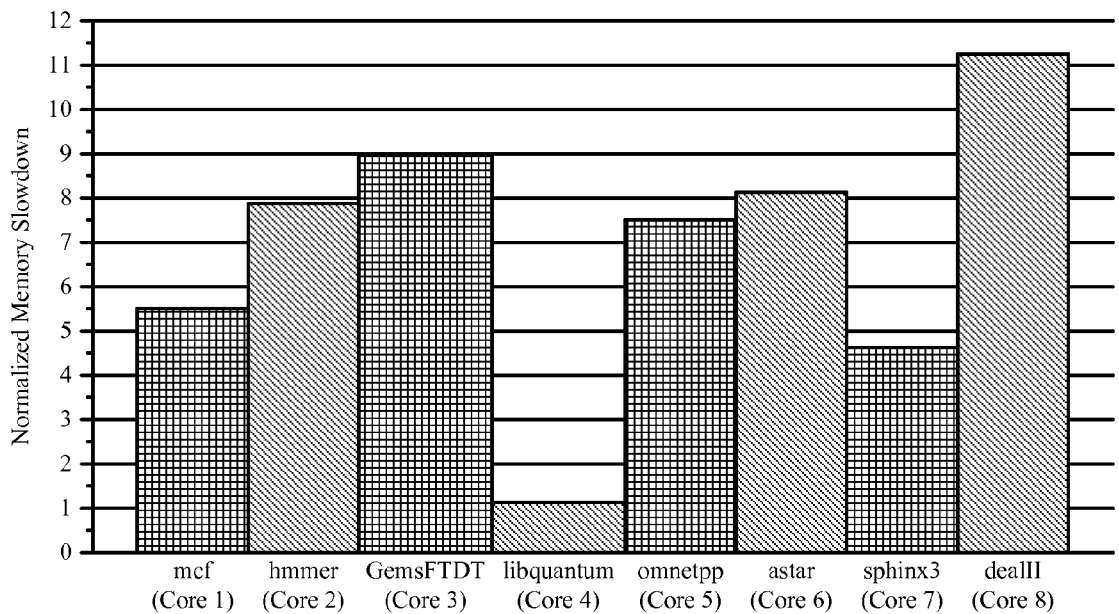

This memory scheduling unfairness problem is illustrated by graphs 210 and 220 in FIG. 2, which show memory-related slowdowns of different threads on a 4-core and an 8-core CMP system. Specifically, graph 210 illustrates memory stall time data for a 4-core CMP system, and graph 220 illustrates memory stall time data for an 8-core CMP system. In one example, the memory-related slowdown of a thread is defined as the memory stall time (e.g., the number of cycles in which a thread cannot commit instructions due to a memory access) experienced by a thread when running simultaneously with other threads, divided by the memory stall time experienced by the thread when running alone. In the example illustrated by graphs 210 and 220, the illustrated cores have private L2 caches but share a common memory controller and DRAM memory. As graphs 210 and 220 illustrate, there is a significant variance between the memory-related slowdowns experienced by the threads in both systems. As graph 210 illustrates for the 4-core system, omnetpp experiences a slowdown of 7.74× whereas libquantum experiences a slowdown of only 1.04× (i.e., almost no slowdown at all). Further, as graph 220 illustrates, the problem is exacerbated in the 8-core system, where dealII experiences a slowdown of 11.35× while libquantum experiences only a 1.09× slowdown. This can be explained by the fact that libquantum is a memory-intensive streaming application with a very high row-buffer locality while the other applications have significantly lower row-buffer hit rates. Since libquantum can generate its row-buffer-hit memory requests at a high rate of speed compared to the other processes, its accesses are almost always prioritized over accessed by other threads under the FR-FCFS scheduling algorithm. Thus, as graphs 210 and 220 illustrate, trying to maximize DRAM throughput with FR-FCFS scheduling results in significant unfairness across threads in a CMP system.

Accordingly, to mitigate these problems, system 100 can include a scheduling component 130, which can utilize one or more memory scheduling algorithms described herein to provide fairness to different threads sharing a DRAM memory system. As used herein, memory scheduling is deemed fair if memory-related slowdowns of equal-priority threads running together on a CMP system are equal. Hence, the quality of service (QoS) goal of the techniques utilized by the scheduling component 130 as described herein is to equalize the memory-related slowdown experienced by each thread due to interference from other threads without hurting overall system performance. In one example, the scheduling component 130 can include a thread analysis component 132 that analyzes one or more threads requesting access to the memory system 120 based on an effect of at least one of memory bandwidth, latency, and bank parallelism on performance of the memory system 120. Additionally and/or alternatively, the scheduling component 130 can include a thread prioritization component 134 that applies a stall-time fairness policy to prioritize requests from the one or more threads based on the analysis of the thread analysis component 132. Various techniques that can be utilized by the thread analysis component 132 and/or the thread prioritization component 134 are described in further detail infra.

Figure 3:
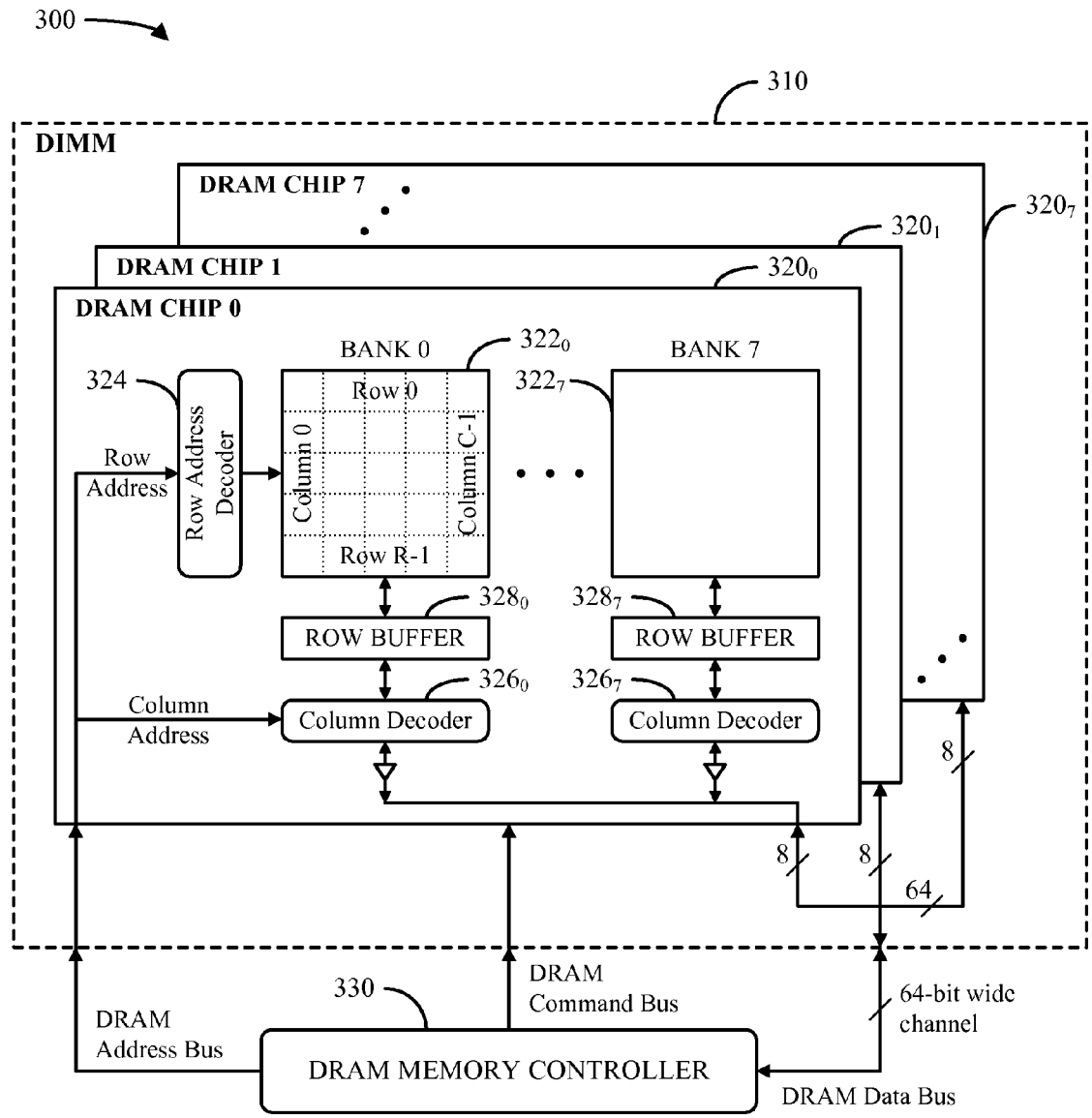
FIG. 3 is a diagram of an example DRAM system with which various aspects described herein can function.

Referring now to FIG. 3, a diagram 300 of an example DRAM system with which various aspects described herein can function is illustrated. While the following description generally relates to a double-data-rate two synchronous dynamic random access memory (DDR2 SDRAM) system, it should be appreciated that the aspects described herein are generally applicable to any DRAM type that employs a page mode.

By way of specific example, a modern SDRAM system, as illustrated by diagram 300, can include one or more dual in-line memory modules (DIMMs) 310. In one example, a DIMM 310 can be comprised of multiple SDRAM chips 320, which can be put together and accessed in parallel. While FIG. 3 illustrates a DIMM 310 having 8 SDRAM chips 320, it should be appreciated that DIMM 310 could have any appropriate number of SDRAM chips 320. In accordance with one aspect, each SDRAM chip 320 may have a narrow data interface (e.g., 8 bits) due to packaging constraints and/or other factors. Thus, combining several SDRAM chips 320 in a DIMM 310 can widen the data interface (e.g., to 64 bits) to the DRAM system 300. In one example, an SDRAM chip 320 can comprise multiple independent memory banks 322, which can be configured such that memory requests to different banks 322 can be serviced in parallel. While FIG. 3 illustrates an SDRAM chip 320 having 8 memory banks 322, it should be appreciated that SDRAM chips 320 in system 300 can have any appropriate number of memory banks. In another example, memory banks 322 can be organized as two-dimensional arrays of DRAM cells, each of which can include multiple rows and columns. Accordingly, a memory location in the DRAM system 300 can be accessed using a DRAM address consisting of bank, row, and column fields. Upon obtaining such a DRAM address, an SDRAM chip 320 can utilize one or more row address decoders 324 and/or column address decoders 326 to facilitate access to the corresponding memory location in the DRAM system 300.

In one example, only one row in a memory bank 322 can be physically accessed at a given time. This row can be stored in a row buffer 328 (e.g., a sense amplifier) dedicated for the memory bank 322. The size of a row buffer 328 in a DRAM chip 320 can be, for example, 1-2 kilobytes (KB), thereby allowing the row buffer 328 to hold tens of cache lines. In one example, an activate command and/or another suitable mechanism can be utilized to move a row from a memory bank 322 to a row buffer 328 (e.g., to open a row). Once a row has been placed in the row buffer 328, read and/or write commands can then be issued to read data from and/or write data into one or more memory addresses (e.g., columns) contained in the row.

As a result of the above row access technique, the latency of a memory request can depend on whether or not a requested row is in the row buffer of a bank. Accordingly, a memory request can fall into one or more of three categories. Under the first such category, referred to herein as a "row hit," a memory request accesses a row currently in the row buffer. In such a case, only a read or a write command is needed. Because only a column access is required, these memory requests result in the lowest bank access latency (referred to as $t_{CL}$ in DRAM nomenclature). Under the second category, referred to herein as "row closed," there is no row in the row buffer at the time of a memory request. Accordingly, an activate command is required to open the requested row followed by a read or write command. Because both a row access and a column access are required, the bank latency of this case is $t_{RCD}+t_{CL}$. Under the third such category, referred to herein as "row conflict," a memory request is directed to a row different from a row currently in the row buffer. In such a case, the contents of the row buffer first need to be written back into the memory array using a precharge command and/or another appropriate mechanism, as opening a row can destroy the contents of the opened row in the memory array. Following this operation, the requested row can then be opened and accessed using the activate and read/write commands. This results in the highest bank access latency, which can be expressed as $t_{RP}+t_{RCD}+t_{CL}$.

In each of the above cases, transferring an entire cache line to or from the DRAM bank over the DRAM data bus can incur additional latency. In one example, a cache line can be transferred using burst mode and a programmable burst length (BL) can control a number of cycles the transfer takes.

In accordance with another aspect, system 300 can utilize a DRAM controller 330 to serve as a mediator between processors and the DRAM system 300. In one example, the DRAM controller 330 is charged with satisfying memory requests from processors and/or other requesting entities while obeying the timing and resource constraints of the DRAM banks, chips, and address and/or data buses of the DRAM system 300. In accordance with one aspect, the DRAM controller 300 can accomplish these goals by translating processor requests into DRAM commands.

In one example, the DRAM controller 330 can include a request buffer, which can hold state(s) associated with respective memory requests (e.g. address, type, identifier, age of the request, readiness, completion status, etc.). The request buffer can be organized as a single unified buffer for all banks, or alternatively multiple per-bank buffers can be utilized. In addition, the DRAM controller 330 can include read/write data buffers, which can hold data that is read from and/or written to the DRAM system 300. In one example, each memory read/write request is allocated an entry in its respective buffer until the request is completely serviced. Further, the DRAM controller 330 can include a DRAM access scheduler, which can determine one or more DRAM commands to issue for each DRAM clock cycle. In one example, a DRAM access scheduler can include logic that keeps track of the state of the DRAM banks and DRAM bus as well as timing constraints of the DRAM. In addition, a DRAM access controller can take as input the state of memory requests in the request buffer along with the state of the DRAM banks/buses and decide which DRAM command should be issued based on the implemented scheduling and access prioritization policies. In another example, scheduling and access prioritization policies can be generally constructed and implemented to optimize memory bandwidth and latency.

In one example, a DRAM scheduler implemented at the DRAM memory controller 330 can be logically and/or physically implemented as a two-level structure. In such an example, the first level can include per-bank schedulers. A per-bank scheduler can maintain, for example, a logical priority queue of memory requests waiting to be serviced in the bank associated with the per-bank scheduler. By way of specific example, such a logical priority queue can be adjusted every DRAM cycle to sort requests to the bank based on their priorities. Further, the physical structure of a priority queue and an associated scheduler can vary based on implementation. For example, some implementations employ multiple priority encoders and arbiters to implement priority-based selection of requests. Alternatively, some implementations use hardware priority queues that are sorted every DRAM cycle. Based on a maintained priority queue at a per-bank scheduler, the per-bank scheduler can select the highest-priority request from the queue and issue DRAM commands to service that request (while respecting the bank timing constraints). Additionally and/or alternatively, the second level can include an across-bank channel scheduler, which can take as input commands selected by the per-bank schedulers and choose the highest-priority command (while respecting the timing constraints and scheduling conflicts in the DRAM address and data buses). In one example, the prioritization algorithms implemented at the above two levels can determine which memory requests are prioritized over others.

DRAM schedulers can employ a variety of algorithms to prioritize memory requests in a request buffer. For example, the FR-FCFS algorithm is designed to optimize the throughput obtained from a DRAM system 300. To do so, the FR-FCFS algorithm prioritizes DRAM commands in the following order. First, column-first prioritization is applied, wherein ready column accesses (e.g. read and write commands) are prioritized over ready row accesses (e.g., activate and precharge commands). Consequently, row-hit requests are prioritized over row-conflict requests. As used herein, a DRAM command is "ready" if it can be issued without violating the timing constraints and without resulting in bank or bus conflicts. In contrast, DRAM commands that are not ready are not considered by the scheduler. In one example, this column-first policy improves throughput by maximizing the row-buffer hit rate. Second, oldest-first prioritization is applied, wherein ready DRAM commands from older requests (e.g., requests that arrived earlier in the memory controller) are prioritized over those from younger requests. It should be appreciated that a simple FCFS algorithm uses only oldest-first prioritization for commands. Thus, by using FR-FCFS, the oldest row-hit request has the highest priority, whereas the youngest row-conflict request has the lowest.

However, the DRAM command prioritization policies employed by the FR-FCFS algorithm are unfair to different threads for at least two reasons. First, the column-first prioritization policy gives higher priority to threads that have high row-buffer locality. In other words, if a thread generates a stream of requests that access different columns in the same row, another thread that needs to access a different row in the same bank will not be serviced until the column accesses of the first thread are complete. For example, assuming a 2 KB row-buffer size per DRAM chip, 8 DRAM chips per DIMM, and 64-byte cache lines, 2 KB*8/64 B=256 row-hit requests from a streaming thread can be serviced before a row-closed/conflict request from another thread. Second, the oldest-first prioritization policy implicitly gives higher priority to threads that can generate memory requests at a faster rate than others. Requests from less memory-intensive threads are not serviced until all earlier-arriving requests from more memory-intensive threads are serviced. Therefore, less memory-intensive threads suffer relatively larger increases in memory-related stalls.

Figure 4:
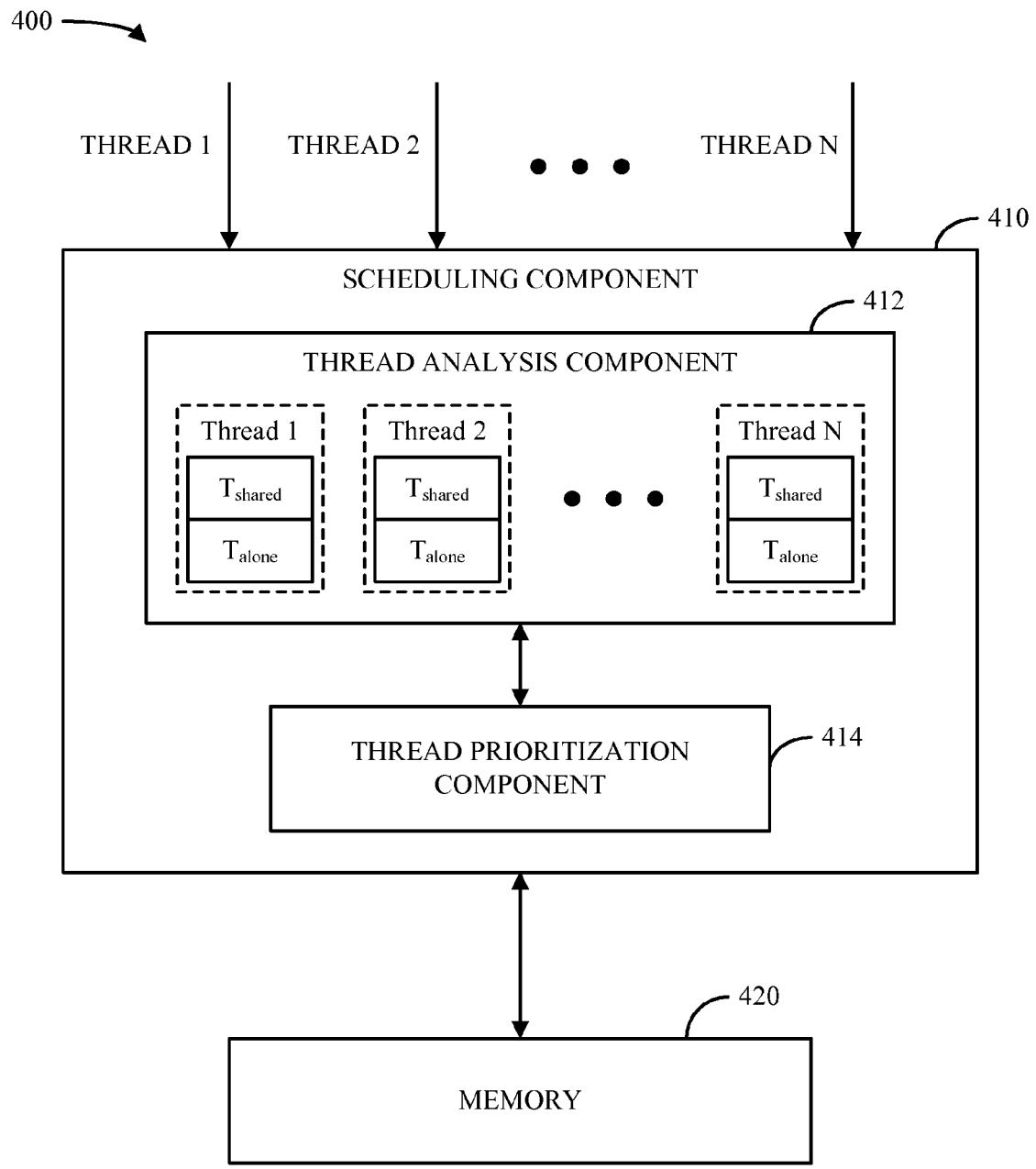
FIGS. 4-5 are block diagrams of respective systems for analyzing and providing stall-time fair memory scheduling for threads in a shared memory system in accordance with various aspects.

Turning to FIG. 4, a system 400 for analyzing and providing stall-time fair memory scheduling for threads in a shared memory system in accordance with various aspects is illustrated. System 400 can include a scheduling component 410, which can schedule requests made by one or more threads for access to a memory 420. The scheduling component 410 can include a thread analysis component 412 and a thread prioritization component 414, which can operate as described in further detail below. In view of the unfairness associated with conventional memory access algorithms such as FR-FCFS as noted above with regard to FIG. 3, scheduling component 410 can schedule memory accesses in a manner that is fair to threads executing on different cores without sacrificing system throughput.

In accordance with one aspect, the scheduling component 410 can operate to provide stall-time fairness to respective threads in a shared memory system. It should be appreciated, however, that defining fairness in DRAM systems is non-trivial. For example, simply dividing DRAM bandwidth evenly across all threads is generally insufficient because such a division would penalize threads with "good" row-buffer locality, high parallelism, or threads that by virtue of their memory access behavior are generally able to achieve a higher throughput to the DRAM system than others. In accordance with one aspect, the performance degradation experienced by a thread due to DRAM interference can be primarily characterized by the extra memory-related stall-time that results from contention with requests from other threads. Because DRAM banks have limited bandwidth, simultaneously executing multiple threads on different cores can cause the memory-related stall-time of threads to increase. Thus, the goal of scheduling component 410 can be defined as balancing these extra stall times across different threads such that all threads exhibit a similar slowdown (assuming that threads have equal priority or weight). Accordingly, system 400 can operate under the following, fundamentally novel definition of DRAM fairness: A stall-time fair DRAM scheduler schedules requests in such a way that extra memory-related slowdown (e.g., due to interference caused by other threads) is equalized across all threads.

In accordance with one aspect, system 400 can operate as follows in order to achieve stall-time fairness. First, a thread analysis component 412 and/or another suitable module associated with the scheduling component 410 can maintain two values for each thread: $T_{shared}$ and $T_{alone}$. In one example, a $T_{shared}$ value for a thread represents the memory-related stall-time (e.g., in processor cycles) experienced by the thread in the shared DRAM system (or an approximation thereof) when running alongside other threads. Additionally and/or alternatively, a $T_{alone}$ value for a thread can express the estimated memory-related stall-time the thread would have experienced if it had run alone (e.g., without any contending threads on other cores). Based on these two estimates, the scheduling component 410 can compute a memory-slowdown S for each thread, where $S=T_{shared}/T_{alone}$. In one example, a thread has high memory-slowdown S if memory-related stall-time actually experienced by the thread is high and the stall time would have been low without interference caused by other threads. Conversely, a thread has low memory-slowdown S if the memory stall-time of the thread is similar to when it runs alone. Based on this analysis, a thread prioritization component 414 and/or another module associated with the scheduling component 410 can achieve stall-time fairness among threads requesting access to the memory system 420 by prioritizing requests from threads with very high memory-slowdown S, thereby equalizing the memory slowdown across all threads.

In accordance with one aspect, the scheduling component 410 can utilize a STFM algorithm to perform memory access scheduling as follows. In the following description, it is assumed that all threads are equally important (e.g., all threads are equally weighted). Techniques for incorporating thread weights or thread priorities are provided infra.

In one example, the scheduling component 410 can first estimate values of $T_{shared}$ and $T_{alone}$ for each thread requesting access to memory 420. Accurate estimates for $T_{shared}$ can be obtained, for example, by utilizing data relating to a counter maintained by a processor associated with system 400. For example, the processor can increase a counter when it cannot commit instructions due to an L2-cache miss. This counter can then be communicated to the scheduling component 410. Techniques for obtaining accurate estimates for $T_{alone}$ are described in more detail infra.

Based on the estimates obtained by the scheduling component 410 for $T_{shared}$ and $T_{alone}$ (e.g. via the thread analysis component 412), the scheduling component 410 can compute the slowdown $S=T_{shared}/T_{alone}$ for each thread. Based on the slowdowns S for each thread, the scheduling component 410 can utilize STFM (e.g., via the thread prioritization component 414) to determine the next command to be scheduled as follows. First, unfairness can be determined by determining the threads having the highest slowdown ($S_{max}$) and the lowest slowdown ($S_{min}$) from among all threads that have at least one ready request in the thread buffer. Next, the ratio $S_{max}/S_{min}$ is compared to an unfairness threshold α. If the ratio $S_{max}/S_{min} \leq \alpha$, the acceptable level of unfairness is not exceeded and, in order to optimize throughput, the next DRAM command can be selected according to FR-FCFS priority rules. If, on the other hand, the ratio $S_{max}/S_{min} > \alpha$, then unfairness can be decreased by prioritizing requests of the thread $T_{max}$ having the largest slowdown $S_{max}$.

By way of specific example, DRAM commands can be prioritized in the following order where reprioritization is required: (1) $T_{max}$-first, wherein ready commands from requests issued by $T_{max}$ are prioritized over any command from requests issued by other threads, (2) column-first, wherein ready column accesses are prioritized over ready row accesses, and then (3) oldest-first, wherein ready commands from older requests are prioritized over those from younger requests. Thus, in general, the scheduling component 410 can use either a baseline FR-FCFS policy (e.g. if the level of unfairness across threads with ready requests is acceptable) or a fair FR-FCFS policy in which requests from the most slowed-down thread receive highest priority.

Figure 5:
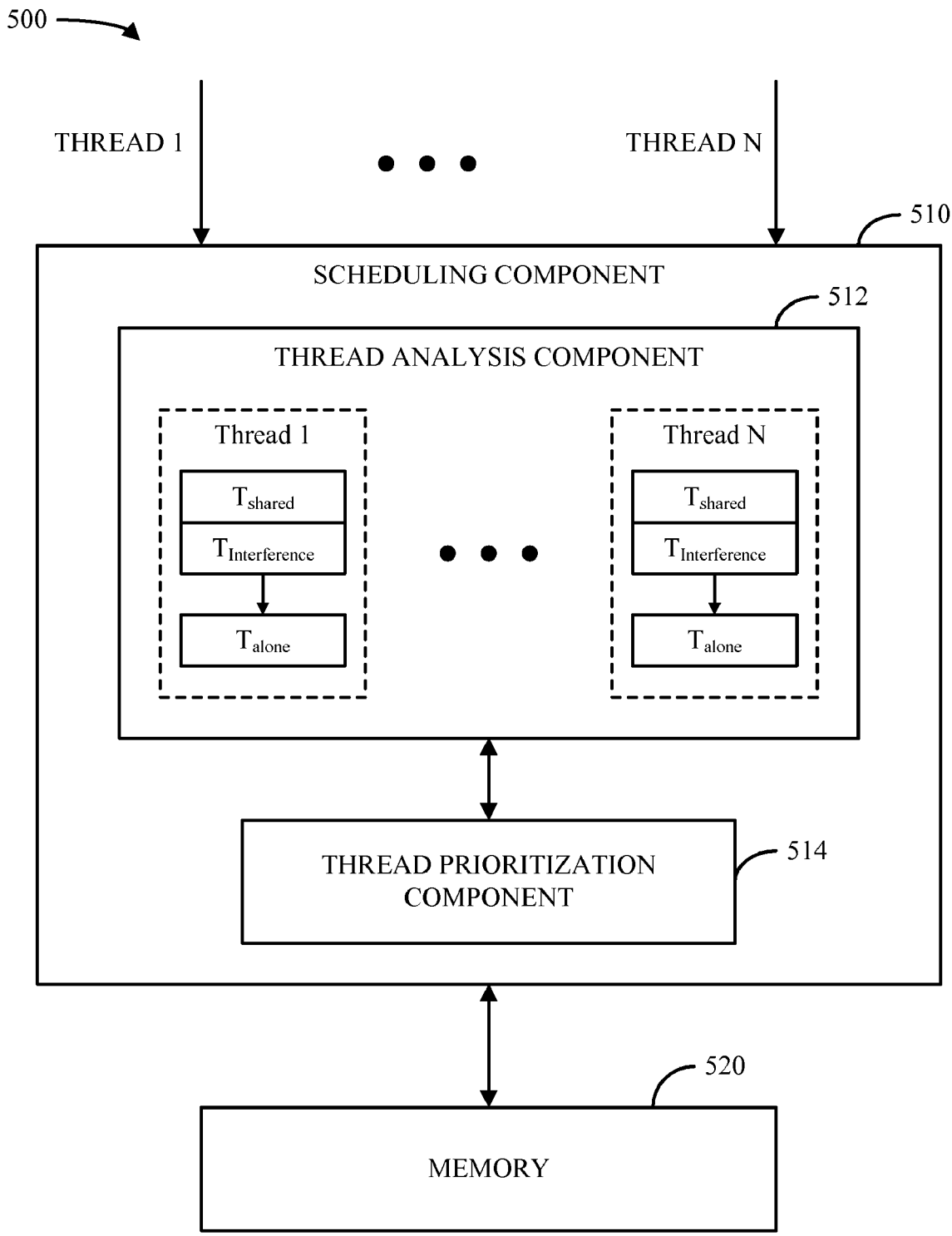

Turning now to FIG. 5, another system 500 for analyzing and providing stall-time fair memory scheduling for threads in a shared memory system is illustrated. Like system 400, system 500 can include a scheduling component 510 for scheduling requests for access to a memory 520, which can incorporate a thread analysis component 512 and/or a thread prioritization component 514. Further, the scheduling component 510 can schedule memory requests from threads by estimating values of $T_{shared}$ and $T_{alone}$ for each such thread and applying a stall-time fairness policy to prioritize the requests based on the estimated values in a similar manner to the scheduling component 410.

In accordance with one aspect, values of $T_{alone}$ can be maintained for each thread by the scheduling component 510 as follows. To estimate $T_{alone}$ for a thread using STFM, it can be determined how much memory stall-time the thread would have accrued if it had executed by itself. As directly determining $T_{alone}$ while a thread is running with other threads can be difficult, $T_{alone}$ can be expressed as $T_{alone}=T_{shared}-T_{Interference}$ and $T_{Interference}$ can be estimated instead. In one example, $T_{Interference}$ represents the extra stall-time experienced by a thread due to requests from other threads being serviced by the memory 520 ahead of requests from the thread for which $T_{Interference}$ is expressed. Thus, in order to compute the memory slowdown S for each thread, a thread analysis component 512 and/or another suitable module associated with the scheduling component 510 can maintain an estimate of $T_{Interference}$ for each thread.

In one example, the value of $T_{Interference}$ for each thread is initially set to zero. The $T_{Interference}$ value for each thread can then be updated whenever the scheduling component 510 schedules a request. For example, when a request is issued to a DRAM bank at memory 520, the extra stall-time $T_{Interference}$ of all other threads that have a ready request (e.g., a request that can be scheduled by the controller 510 without violating timing constraints) to the same bank increases. These ready requests could have been scheduled if the thread that generated them had run by itself, but they were delayed due to interference from other threads, thereby increasing the extra stall-time of the thread. Hence, the scheduling component 510 can adjust its estimate of $T_{Interference}$ for the thread appropriately.

In accordance with one aspect, when a request R from a thread C is scheduled, the scheduling component 510 can update the $T_{Interference}$ values of all threads. In one example, STFM can be utilized by the scheduling component 510 to update $T_{Interference}$ differently for the thread making the request versus other threads as follows. For the other threads, the extra stall time a scheduled request inflicts on another thread that has an outstanding ready request can include two portions: extra stall time due to interference in a DRAM bus associated with the memory 520, and extra stall time due to interference in a DRAM bank associated with the memory 520.

For extra stall time due to interference in the DRAM bus, $T_{Interference}$ can be updated as follows. When a read/write command is sent over the bus to a DRAM bank, the command can keep the DRAM data bus busy for $t_{bus}$ cycles. In one example, the value of $t_{bus}$ can depend on the DRAM type, command type and burst length. For example, for a read or write command, $t_{bus}$=BL/2 for DDR2 SDRAM. During the time the read/write command keeps the DRAM data bus busy, no other thread is able to schedule a read/write command even though the commands might otherwise be ready to be scheduled. Hence, the $T_{Interference}$ of each thread (except the requesting thread C) that has at least one ready read/write command in the request buffer can be increased by $t_{bus}$.

Alternatively, for extra stall time due to interference in the DRAM bank, $T_{Interference}$ can be updated as follows. Because thread C has issued a request R, other threads with requests to the same bank have to wait for the request R to be serviced and therefore experience an increased stall-time. However, merely increasing $T_{Interference}$ of these threads by the service latency of R can be insufficient as it ignores memory-level parallelism of threads. This can be illustrated by way of the following specific, non-limiting example. Assume two requests R1 and R2 are simultaneously being serviced in two different banks. Further, assume that another thread C' has ready requests for both of these banks that are waiting in the memory request buffer. As the requests of C' need to wait for R1 and R2 to be serviced first, C' accrues extra stall-time. However, it is generally not accurate to assume that the extra stall-time caused by R1 and R2 is the sum of the latencies of R1 and R2. Instead, because R1 and R2 can be serviced in parallel, these two requests can instead cause extra stall-time in the order of one memory access latency.

Thus, in accordance with one aspect, an update mechanism associated with the scheduling component 510 can take into account the parallelism inherent to each thread as follows. If a thread C' has ready requests waiting to be serviced in X different banks, then the extra latency thread C' incurs due to the scheduling of request R from another thread can be amortized across those waiting requests. As a result, the extra stall-time of thread C' due to request R can be approximately equal to the service latency of R divided by X. As used herein, the value X is referred to as the BankWaitingParallelism(C') of thread C'. It should be appreciated, however, that this is merely an example of a technique that can be utilized for approximating extra stall-time experienced by a thread and that other suitable techniques, such as determining whether a delayed request is on the critical path of execution, could also be utilized.

Based on the above approximation, the scheduling component 510 can utilize STFM to estimate the extra stall-time caused by a request to other threads as follows. When the scheduling component 510 schedules a DRAM command R from thread C to bank B, it can increase the $T_{Interference}$ of any thread C'≠C that has at least one ready command waiting to be scheduled to bank B. Thus, if Latency(R) is the service latency of R, the new $T_{Interference}$, which can be denoted as $T_{Interference}^{new}$(C'), can be expressed as follows:

$$T_{Interference}^{new}(C') = T_{Interference}^{old}(C') + \frac{Latency(R)}{\gamma * BankWaitingParallelism(C')}. \quad (1)$$

As used in Equation (1), the constant γ is a parameter that determines how aggressively the scheduling component 510 should consider its (potentially inaccurate) estimate of BankWaitingParallelism in its updates of $T_{Interference}$. The constant γ is used as a scaling factor due to the fact that the actual bank parallelism value is an estimate and that some of the waiting requests estimated to be serviced in parallel might not actually be serviced in parallel in the future. In one example, γ can be set to ½ for simplicity of implementation.

In addition to updating $T_{Interference}$ for other threads, the value of $T_{Interference}$ can also be adjusted for a requesting thread by the scheduling component 510 due to the fact that even a thread whose own request is being scheduled may experience extra stall-time (e.g., the request may be delayed more than it would have been if it had run alone). By way of example, a thread can have two consecutive requests R1 and R2 to the same row in the same bank. If the thread was running alone, its second request would result in a row-hit (with latency $t_{CL}$). In a shared DRAM system, however, it is possible that other requests from other threads can be serviced between R1 and R2 and, therefore, R2 could result in a row-conflict with much higher latency (e.g., $t_{RP}$+$t_{RCD}$+$t_{CL}$).

To account for this potential extra stall time, the scheduling component 510 can determine whether a scheduled request would have been a row-hit or a row-conflict had the thread run alone. In one example, this can be determined by maintaining the address of the last accessed row by each thread in each bank. If the scheduled request is a row-conflict but would have been a row-hit had thread C run alone, then the $T_{Interference}$ value of C can be increased by the difference in latency between a row-conflict and a row-hit (e.g., ExtraLatency=$t_{RP}$+$t_{RCD}$) divided by the bank access parallelism of C. This can be expressed as follows:

$$T_{Interference}^{new}(C) = T_{Interference}^{old}(C) + \frac{ExtraLatency}{BankAccessParallelism(C)}. \quad (2)$$

It should be appreciated that the full ExtraLatency is not added to $T_{Interference}$ in Equation (2) because the whole ExtraLatency may not manifest itself as extra stall time for thread C. For example, if more than one request from C is being serviced in parallel in different DRAM banks, some of the ExtraLatency will remain hidden because it will be amortized across those concurrent requests. Therefore, as can be observed from Equation (2), ExtraLatency can be divided by BankAccessParallelism. As used in Equation (2), BankAccessParallelism is the number of requests that are currently being serviced in DRAM banks by the thread under consideration. In other words, BankAccessParallelism is the number of banks that are kept busy due to requests by thread C.

Figure 6:
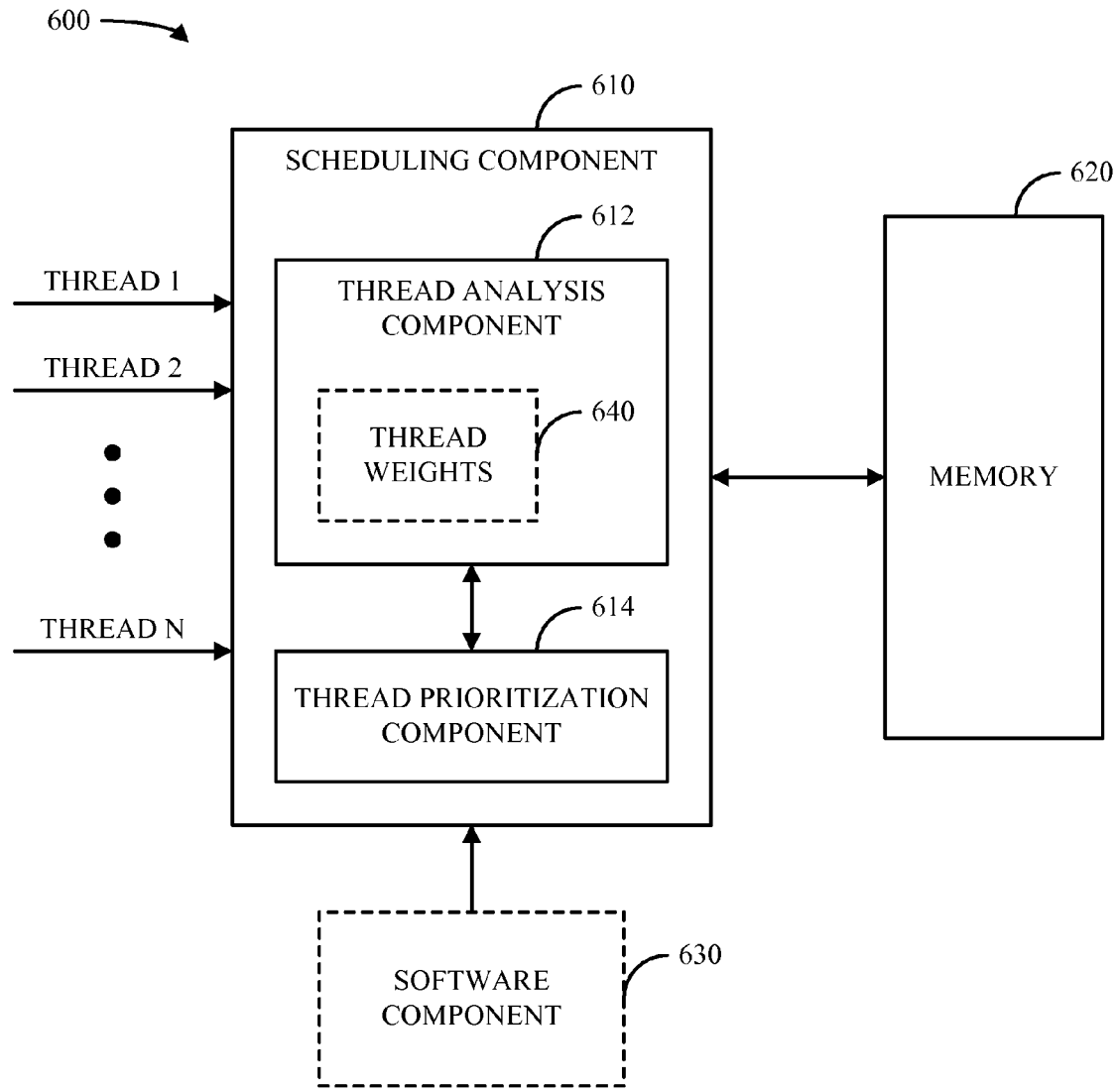
FIG. 6 is a block diagram of a system for software-configurable memory access scheduling in accordance with various aspects.

Referring now to FIG. 6, a system 600 for software-configurable memory access scheduling is illustrated. In a similar manner to systems 400 and 500, system 600 can include a scheduling component 610 that can schedule requests by one or more threads of execution for access to a shared memory 620. As stated in the above description regarding systems 400 and 500, it was assumed that fairness should be enforced by equalizing memory-related slowdown among threads. However, in some instances, this may not be desirable at the system level. For example, a software component 630 associated with system 600 (e.g., an operating system, a virtual machine monitor, and/or one or more other suitable software modules) may not want fairness to be directly enforced by hardware (e.g., the scheduling component 610 and/or other such components) due to the fact that hardware enforcement could adversely interact with high-level fairness mechanisms of the software component 630, such as fair thread scheduling. Additionally and/or alternatively, the software component 630 may not want threads to be treated equally due to the fact that some threads can be more or less important than others. In such a case, it can be appreciated that it is desirable to allow some threads to be slowed down more than others. The system 600 can further include a thread analysis component 612 and a thread prioritization component 614.

Therefore, in accordance with one aspect, the scheduling component 610 can be adjusted to allow enough flexibility to support external control by a software component 630. In one example, the threshold a that denotes the maximum tolerable amount of unfairness can first be set by the software component 630 via a privileged instruction in the instruction set architecture. In the event that the software component 630 does not need hardware-enforced fairness at the scheduling component 610, it can simply supply a very large a value.

In accordance with an additional and/or alternative aspect, to support different treatment of threads based on their importance, the scheduling component 610 can employ thread weights 640 for respective threads. In one specific example, the software component 630 can convey respective weights 640 of each thread requesting access to the memory 620 to the scheduling component 610. In one example, thread weights 640 can be proportional to the importance of a corresponding thread. Thus, for example, a smaller weight can correspond to a less important thread for which slowdown is more tolerable. In another example, threads with equal weights can be slowed down equally.

To support the notion of thread weights 640 and to prioritize threads with larger weights, the scheduling component 610 can scale the slowdown value computed for a thread by the non-negative weight of the thread such that the weighted slowdown for the thread is $S=1+(S-1)*Weight$. In other words, threads with higher weights can be interpreted to be slowed down more, thereby allowing them to be prioritized by the scheduling component 610. For example, for a thread with weight 10, a measured slowdown of 1.1 can be interpreted as a slowdown of 2 whereas the same measured slowdown can be interpreted as 1.1 for a thread with weight 1. It should be appreciated, however, that despite this modification, the ratio $S_{max}/S_{min}$ controls whether or not a fairness rule is applied. In one example, measured slowdowns of threads of equal weight can be scaled equally and therefore treated equally by the scheduling component 610.

Figure 7:
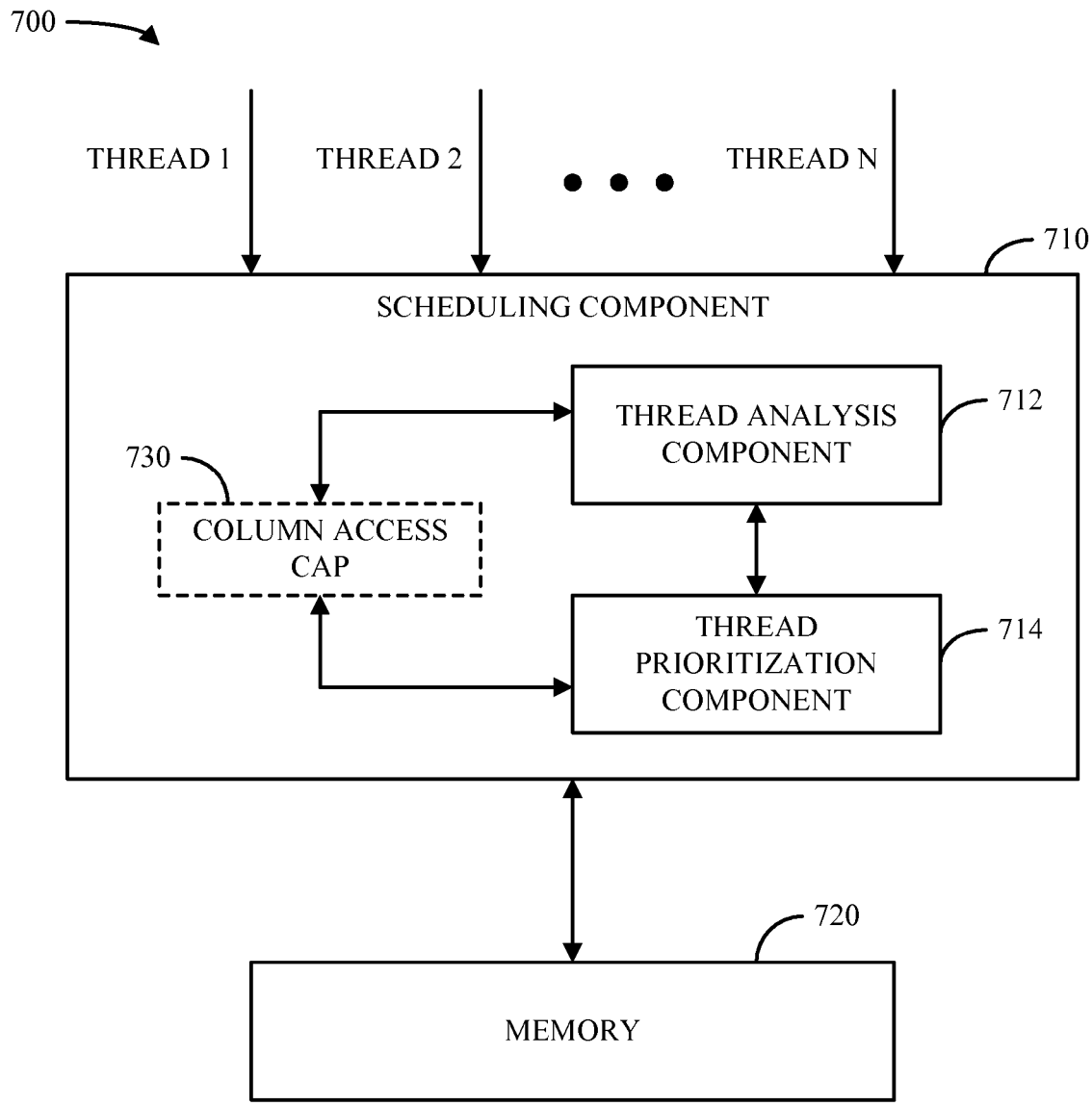
FIG. 7 is a block diagram of a system for cap-based memory access scheduling in a shared memory system in accordance with various aspects.

Turning to FIG. 7, a block diagram of a system 700 for cap-based memory access scheduling in a shared memory system is provided. In accordance with one aspect, system 700 can include a scheduling component 710 that can facilitate stall-time fair scheduling of requests made by various threads of execution for access to a shared memory 720. In one example, the scheduling component 710 can employ a thread analysis component 712 and/or a thread prioritization component 714 in scheduling memory requests.

As an alternative to the STFM scheduling algorithm utilized by systems 400 and 500, the scheduling component 710 in system 700 in accordance with an aspect can implement an FR-FCFS algorithm with a cap on column-over-row reordering (herein referred to as "FR-FCFS+Cap"). In one example, the FR-FCFS+Cap scheduling algorithm can be applied as an extension to the conventional first-come first-serve (FCFS) scheduling policy, which disregards the current state of the row-buffer. In accordance with various aspects, the FR-FCFS+Cap algorithm can overcome many of the traditional deficiencies of the FCFS scheduling policy. For example, the FCFS scheduling policy can overly delay threads that do not issue many memory accesses because requests from these threads can get backed up in the request buffer behind a large number of requests from memory-intensive threads. Further, since FCFS completely neglects the potential performance gain from exploiting row-buffer locality, achieved DRAM throughput deteriorates significantly, which in turn degrades overall system performance. To overcome these deficiencies, the FR-FCFS+Cap scheduling algorithm addresses the reordering of younger column (row-hit) accesses over older row (row-closed/conflict) accesses, which is a major source of unfairness in FR-FCFS. Specifically, the scheduling component 710 can enforce a cap 730 on the number of younger column accesses that can be serviced before an older row access to the same bank. When the column access cap 730 is reached, the FCFS policy can be applied.

In one example, the column access cap 730 utilized by the scheduling component 710 can be configured by hardware, software (e.g., software component 630), and/or any other suitable component or combination thereof. By way of specific, non-limiting example, the cap 730 can be adjusted by software and/or another appropriate component dynamically. In another example, a single cap 730 can be maintained for all threads serviced by the scheduling component 710, or alternatively multiple caps 730 can be maintained and/or adjusted for respective threads.

Figure 8:
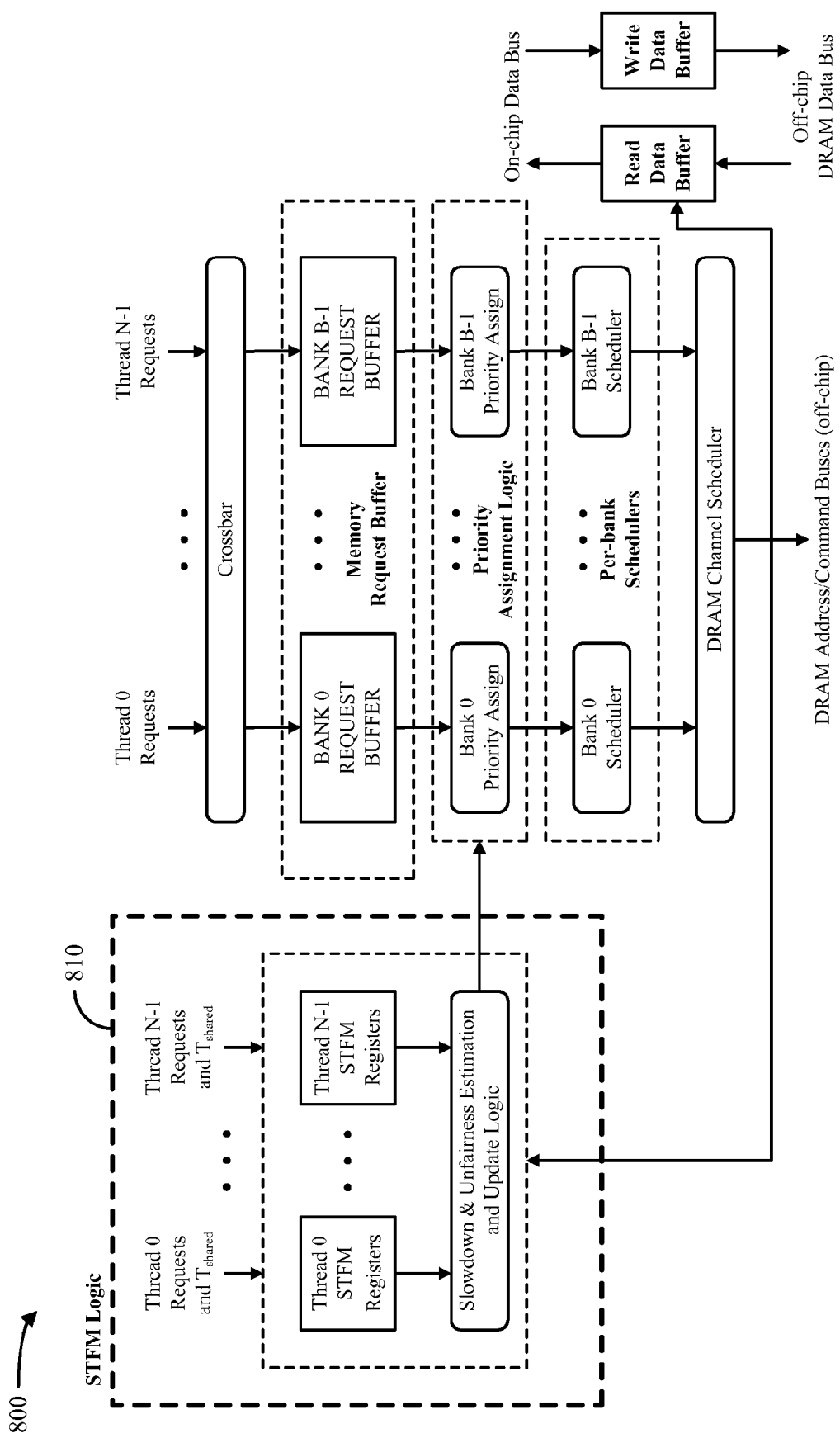
FIG. 8 is a block diagram of an example memory access controller in accordance with various aspects.

Referring now to FIG. 8, a block diagram of an example memory access controller 800 in accordance with various aspects is illustrated. While FIG. 8 and the following discussion generally relate to a memory access controller operable to perform memory access scheduling using STFM, it should be appreciated that similar structures and/or techniques could be employed to implement other suitable scheduling algorithms.

In accordance with one aspect, STFM is implemented by memory access controller 800 by modifying a baseline FR-FCFS scheduler to incorporate an additional priority policy, which provides for prioritization of commands based on the slowdowns of the threads they belong to. In one example, the basic structure of the memory controller as described supra with regard to FIG. 3 is not changed. However, additional circuitry can be added to estimate slowdowns of respective threads, compute unfairness in the system, and/or prioritize commands based on the slowdowns of the threads they belong to.

FIG. 8 illustrates the organization of an example on-chip STFM memory controller 800. Additional logic 810 required for implementing STFM is illustrated in FIG. 8 as boxed. In accordance with one aspect, the logic of the memory controller 800 is very similar to that of a baseline memory controller except for the additional STFM logic 810 implemented on the side of the controller 800 that communicates with the baseline scheduling logic.

To estimate and store the memory-related slowdown S of each thread, the memory controller 800 can maintain a set of registers per hardware thread. These per-thread registers can be reset at every context switch and at regular intervals (e.g. every IntervalLength cycles) to adapt to time-varying phase behavior of the threads. Example registers that can be maintained in one implementation of memory controller 800 are provided in Table 1 below:

TABLE 1

Registers used for an example STFM implementation.

| Register | Function |
|---|---|
| Per-thread registers used to compute and store slowdowns | |
| $T_{shared}$ | Number of cycles in which the thread cannot commit instructions due to L2 miss (supplied by the core) |
| $T_{Interference}$ | Number of extra stall cycles due to interference from other threads (computed in the memory controller) |
| Slowdown | $T_{shared}/(T_{shared} - T_{Interference})$ |
| BankWaitingParallelism | Number of banks that have at least one request that is waiting to be serviced for the thread |
| BankAccessParallelism | Number of banks that are currently servicing requests from the thread |
| Per-thread per-bank registers used in estimating the extra latency due to inter-thread interference | |
| LastRowAddress | The last row address accessed by thread i in bank b |
| Per-request registers stored in the memory request buffer to perform prioritization | |
| ThreadID | The ID of the thread that generated the memory request |
| Individual registers | |
| IntervalCounter | Counter used to reset other registers when it reaches a maximum threshold value IntervalLength |
| Alpha | Register used to store the α value (which can be set by system software) |

Additionally, each entry in a memory request buffer can store the ID of the thread (e.g., thread-ID) that generated the memory request. By way of specific example, in a system with 8 threads, an IntervalLength value of $2^{24}$, 8 DRAM banks, $2^{14}$ rows per bank, and a 128-entry memory request buffer, the additional state required by STFM can be 1808 bits.

In one example, $T_{shared}$ for each thread is the only counter computed in the processor core and communicated to the DRAM scheduler periodically (e.g. with every memory request). For example, the processor core can increment $T_{shared}$ for a thread if the thread cannot commit instructions due to the oldest instruction being an L2 miss. Additionally and/or alternatively, the $T_{Interference}$ and Slowdown registers can be updated when a DRAM command is scheduled. Further, the BankWaitingParallelism registers and Interval-Counter can be updated every DRAM cycle. In addition, a BankAccessParallelism register for a thread can be incremented when a DRAM command for that thread is scheduled and decremented when the command is completely serviced. When a thread initiates a row access in a bank, the LastRow-Address register for that thread-bank pair can also be updated to store the address of the accessed row. Based on these registers, slowdowns can be computed as generally described above.

Logic for updating the above registers can include adders/subtracters, multiplexers, and shifters (e.g., to approximate fixed-point division and multiplication). In addition, the update logic can be pipelined if needed, and various components can be shared by different threads. In one example, flexibility for these changes is provided by the fact that the on-chip DRAM controller is not on the critical path of execution and only needs to make a decision every DRAM cycle, which is significantly longer than the core cycle time of the processor.

In accordance with another aspect, the memory controller 800 can order threads with at least one ready command based on their Slowdown values every DRAM cycle. In addition, the memory controller 800 can compute unfairness by dividing the maximum slowdown value by the minimum slowdown. If the unfairness computed in the previous DRAM cycle is greater than α, the controller 800 can prioritize commands from threads with higher Slowdown values. Otherwise, the controller 800 can prioritize commands using a baseline FR-FCFS policy. Prioritization of commands can be implemented in several different ways. For example, a baseline FR-FCFS implementation can assign a single priority value to each ready command based on its type (e.g., column or row access) and arrival time. A priority encoder can then select the command with the highest priority value. As another example, STFM can additionally determine whether unfairness is greater than α. If such a determination is reached, each ready command can be assigned a priority value based on its Thread-ID (e.g., slowdown), type, and arrival time. Otherwise, the baseline FR-FCFS priority assignments can be used. In accordance with one aspect, a STFM implementation changes only the priority assignment logic without affecting the structure of request buffers or priority encoders.

Turning to FIGS. 9-14, methodologies that may be implemented in accordance with features presented herein are illustrated via series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Figure 9:
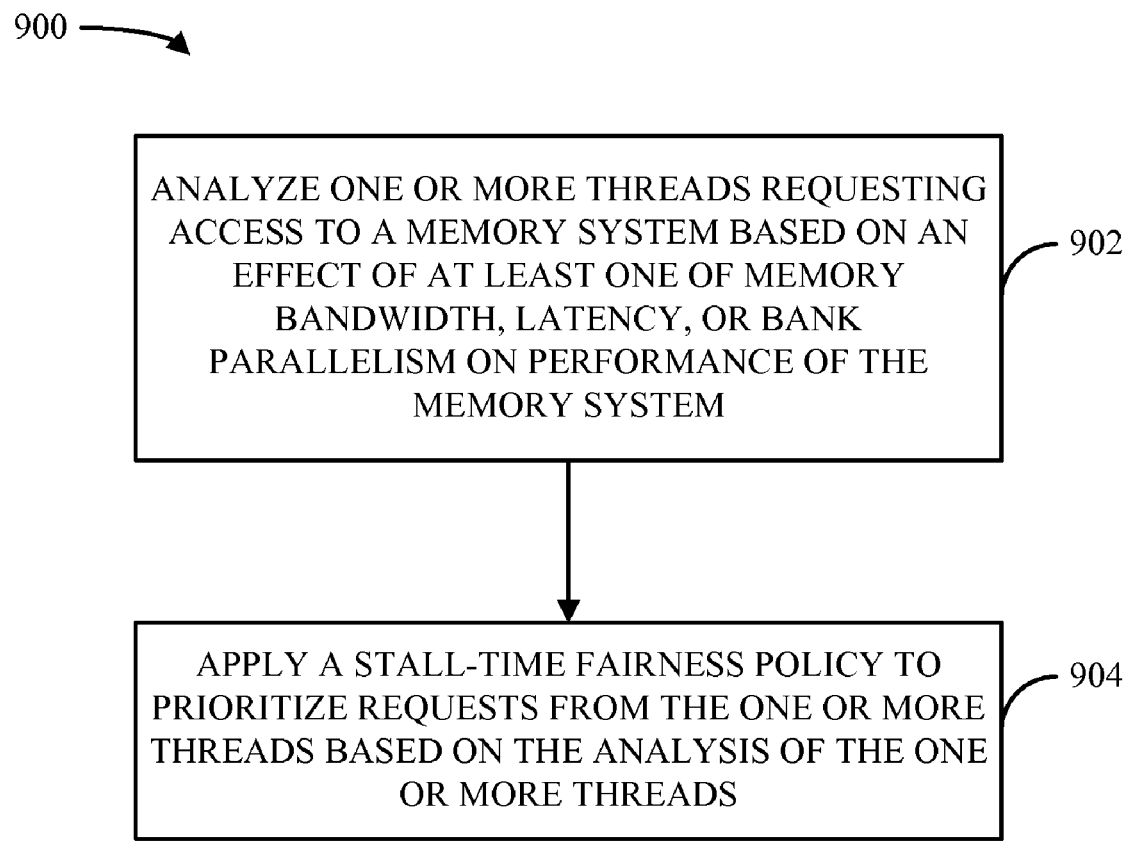
FIGS. 9-11 are flowcharts of respective methods for memory access control in a shared memory system.

Turning to FIG. 9, a method 900 of memory access control for a shared memory system is illustrated. At 902, one or more threads (e.g., threads executed by cores 112 at a processing unit 110) requesting access to a memory system (e.g., memory 120) are analyzed (e.g. by a thread analysis component 132 at a scheduling component 130) based on an effect of at least one of memory bandwidth, latency, or bank parallelism on performance of the memory system. At 904, a stall-time fairness policy is applied (e.g. by a thread prioritization component 134) to prioritize requests from the one or more threads analyzed at 902 based on the analysis of the one or more threads performed at 902.

Figure 10:
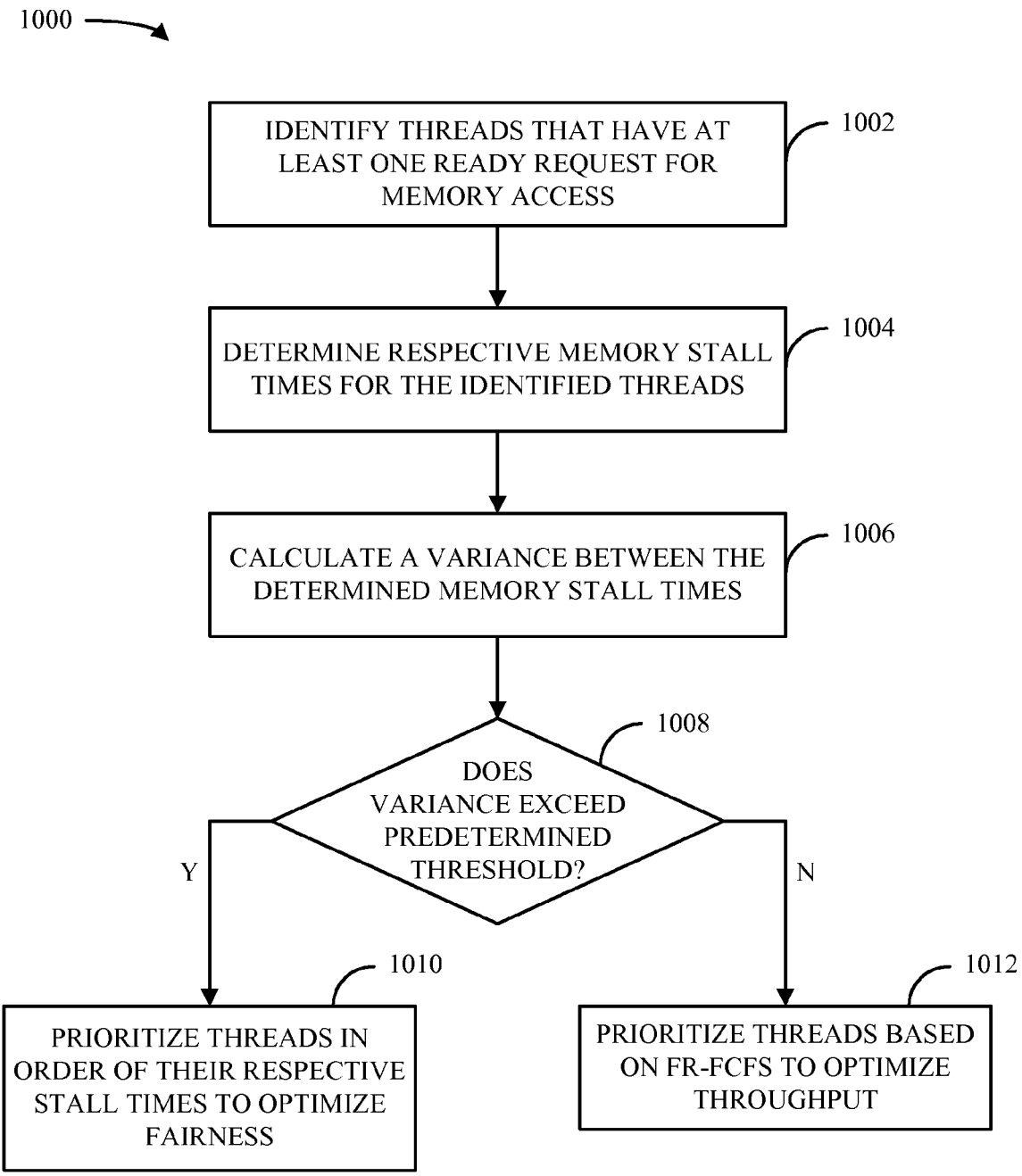

FIG. 10 illustrates another method 1000 of memory access control for a shared memory system. At 1002, threads that have at least one ready request for memory access are identified. At 1004, respective memory stall times are determined for the respective threads. At 1006, a variance is calculated between the respective stall times determined at 1004. At 1008, it is determined whether the variance calculated at 1006 exceeds a predetermined threshold. If the variance does exceed the threshold, method 1000 concludes at 1010, wherein the threads identified at 1002 are prioritized in order of their respective stall times to optimize fairness. If the variance does not exceed the threshold, method 1000 instead concludes at 1012, wherein the threads identified at 1002 are prioritized based on FR-FCFS to optimize throughput.

Figure 11:
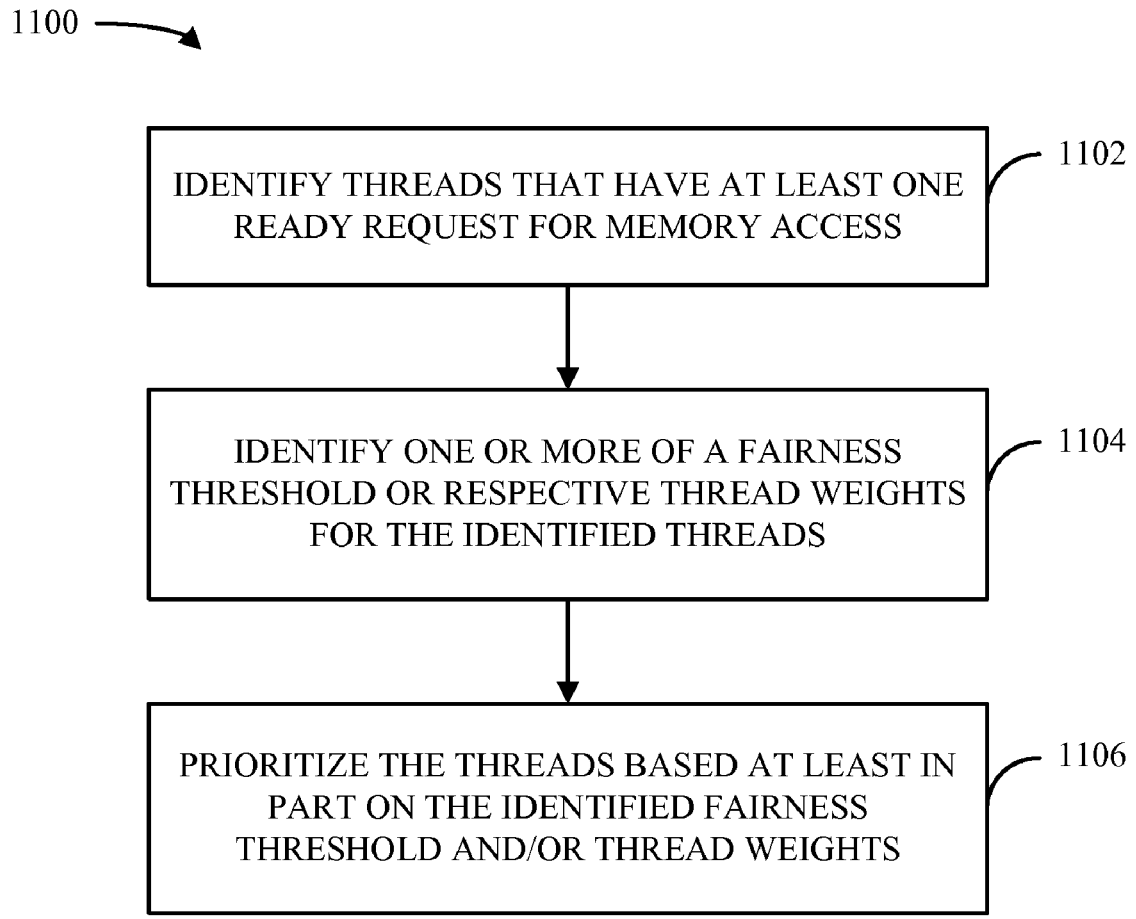

FIG. 11 illustrates an additional method 1100 of memory access control for a shared memory system. At 1102, threads that have at least one ready request for memory access are identified. At 1104, one or more of a fairness threshold and/or respective thread weights (e.g., thread weights 640) for the threads identified at 1102 are identified. In one example, information identified at 1104 can be configured in hardware, in software (e.g., at a software component 630), and/or in a combination thereof. At 1106, the threads identified at 1102 are prioritized based at least in part on the fairness threshold and/or thread weights identified at 1104.

Figure 12:
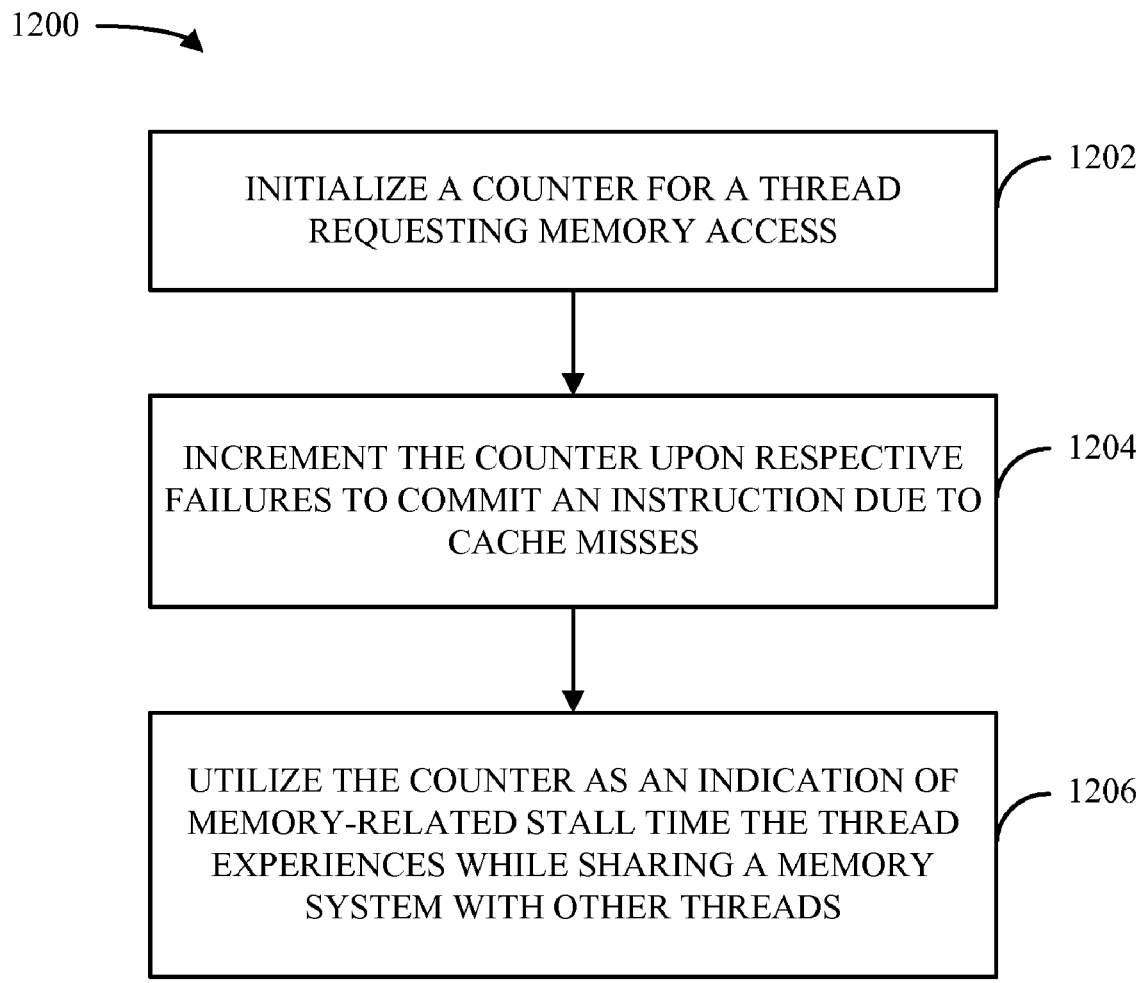
FIGS. 12-13 are flowcharts of respective methods for determining parameters for memory access control in a shared memory system.

Turning now to FIG. 12, a method 1200 for determining parameters for memory access control in a shared memory system is illustrated. At 1202, a counter is initialized (e.g., by a thread analysis component 412 at a scheduling component 410) for a thread requesting memory access (e.g., a thread requesting access to a memory 420). At 1204, the counter initialized at 1202 is incremented upon respective failures to commit an instruction due to cache misses. At 1206, the counter is utilized (e.g., by the thread analysis component 412 and/or a thread prioritization component 414) as an indication of memory-related stall time the corresponding thread experiences while sharing a memory system with other threads (e.g. $T_{shared}$).

Figure 13:
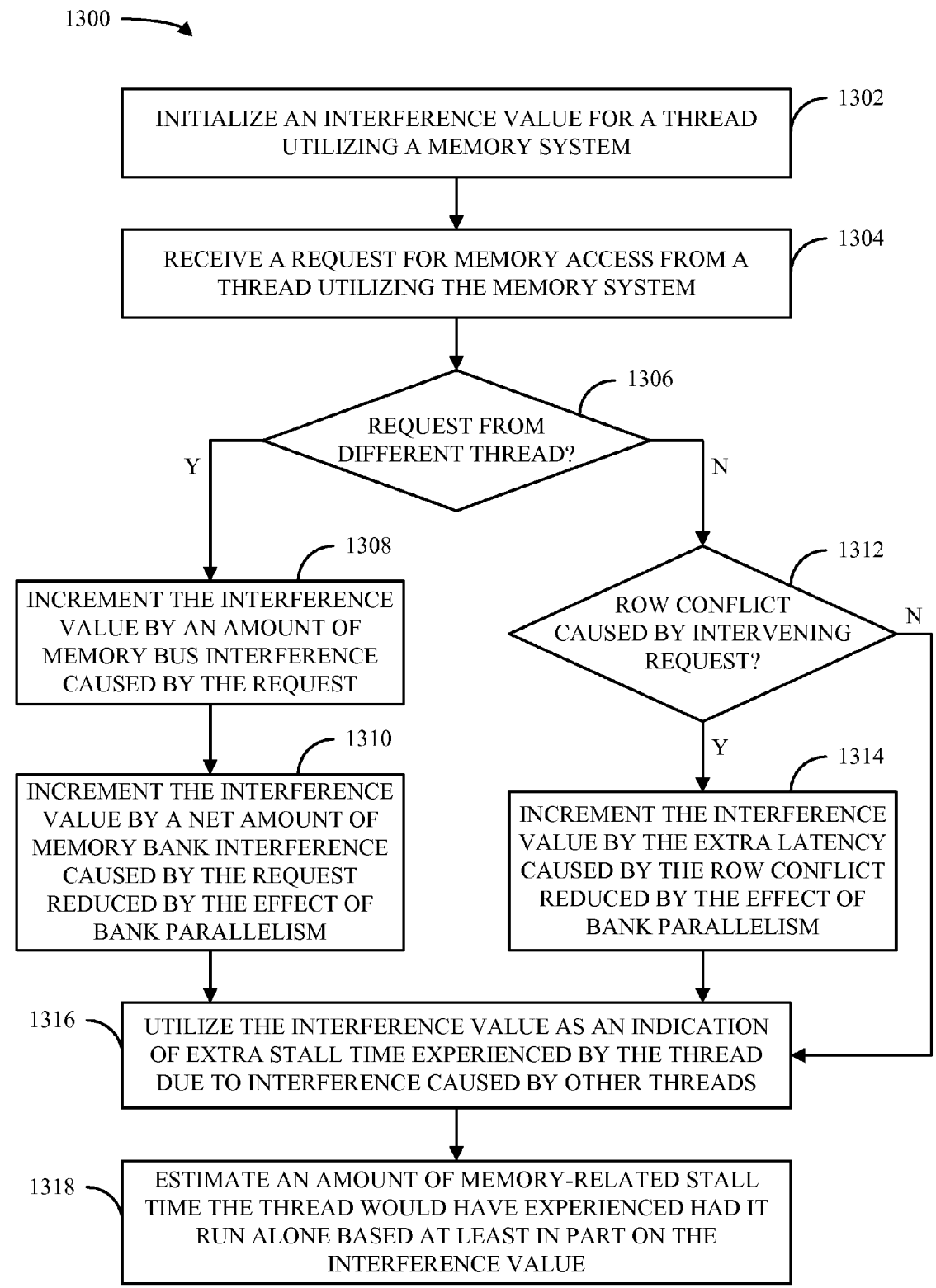

FIG. 13 illustrates a further method 1300 for determining parameters for memory access control in a shared memory system. At 1302, an interference value is initialized (e.g., by a thread analysis component 512 at a scheduling component 510) for a thread utilizing a memory system (e.g. a thread utilizing a shared memory 520). At 1304, a request for memory access is received from a thread utilizing the memory system. It should be appreciated that the request at 1304 can be received from the thread for which the interference value was initialized at 1302 or from a different thread utilizing the memory system. Thus, at 1306, it is determined whether the request at 1304 was received from a different thread than the thread for which the interference value was initialized at 1302. If it is determined at 1306 that the request was made by a different thread, method 1300 can proceed to 1308, wherein the interference value initialized at 1302 is incremented by an amount of memory bus interference caused by the request. From 1308, method 1300 can proceed to 1310, wherein the interference value is further incremented by a net amount of memory bank interference caused by the request reduced by an effect of bank parallelism on the interference.

If, on the other hand, it is determined at 1306 that the request came from the same thread for which the interference value was initialized at 1302, method 1300 can instead proceed to 1312, wherein it is further determined whether a row conflict has been caused by an intervening memory request. If it is determined at 1312 that a row conflict has occurred, method 1300 can proceed to 1314, wherein the interference value initialized at 1302 is incremented by the extra latency caused by the row conflict, reduced by the effect of bank parallelism on the extra latency.

After completing the acts described at 1310 and/or 1314, or upon a negative determination at 1312, method 1300 can proceed to 1316. At 1316, the interference value initialized at 1302 and maintained at 1308-1314 is utilized as an indication of extra stall time experienced by the thread for which the interference value was initialized at 1302 due to interference caused by other threads (e.g., $T_{Interference}$). At 1318, an amount of memory-related stall time the thread for which the interference value was initialized at 1302 would have experienced had it run alone (e.g., $T_{alone}$) can then be estimated based at least in part on the indication provided at 1316.

Figure 14:
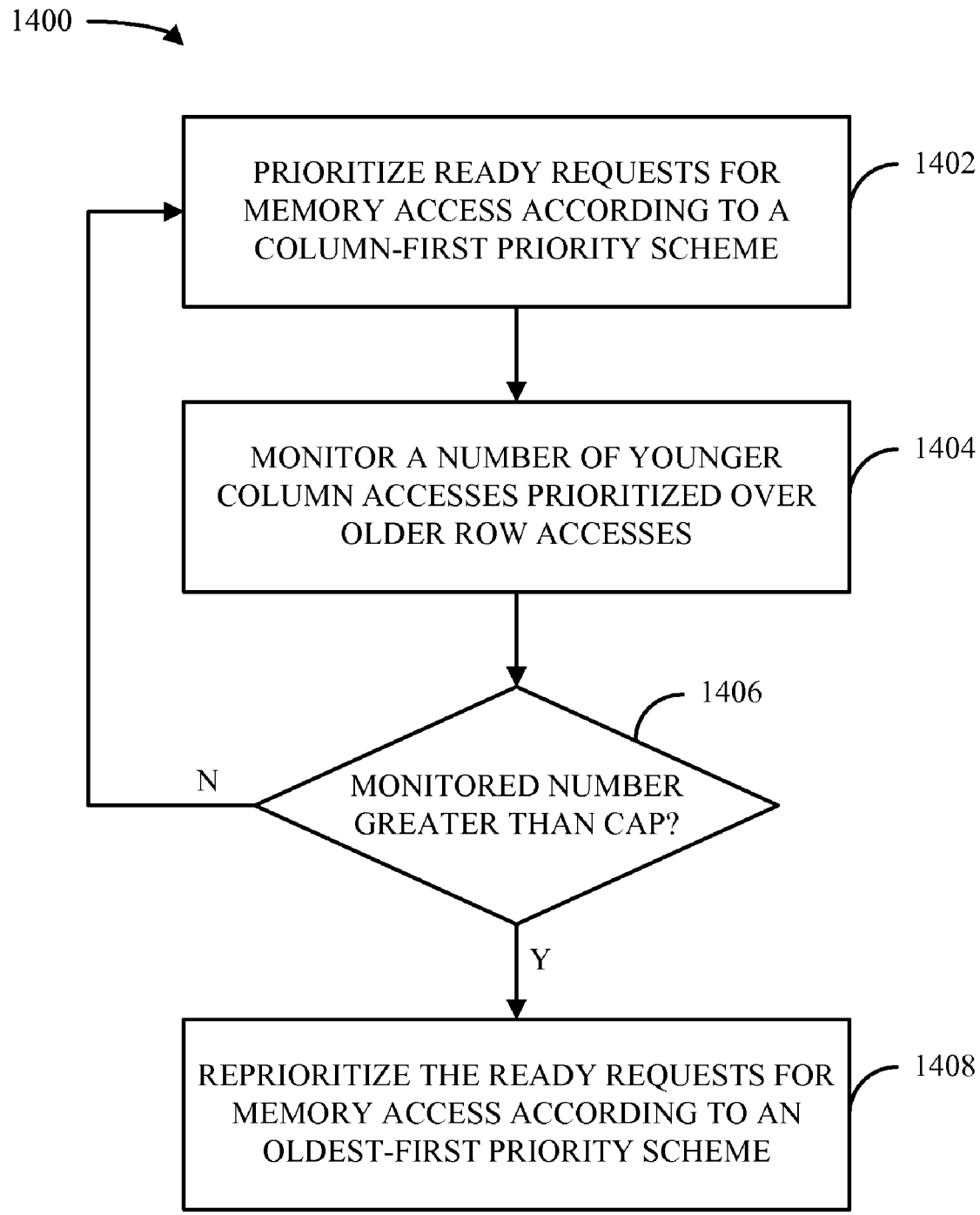
FIG. 14 is a flowchart of a method for cap-based memory access control in a shared memory system.

Referring now to FIG. 14, a flowchart of a method 1400 for cap-based memory access control in a shared memory system is provided. At 1402, ready requests for memory access are prioritized (e.g., by a scheduling component 710) according to a column-first priority scheme. At 1404, the number of younger column accesses prioritized over older row accesses is monitored. At 1406, it is determined whether the number monitored at 1404 is greater than a predetermined column access cap (e.g., column access cap 730). Upon a positive determination at 1406, method 1400 continues to 1408, wherein the ready requests for memory access given at 1402 are reprioritized according to an oldest-first priority scheme. Otherwise, upon a negative determination at 1406, method 1400 returns to 1402.

Figure 15:
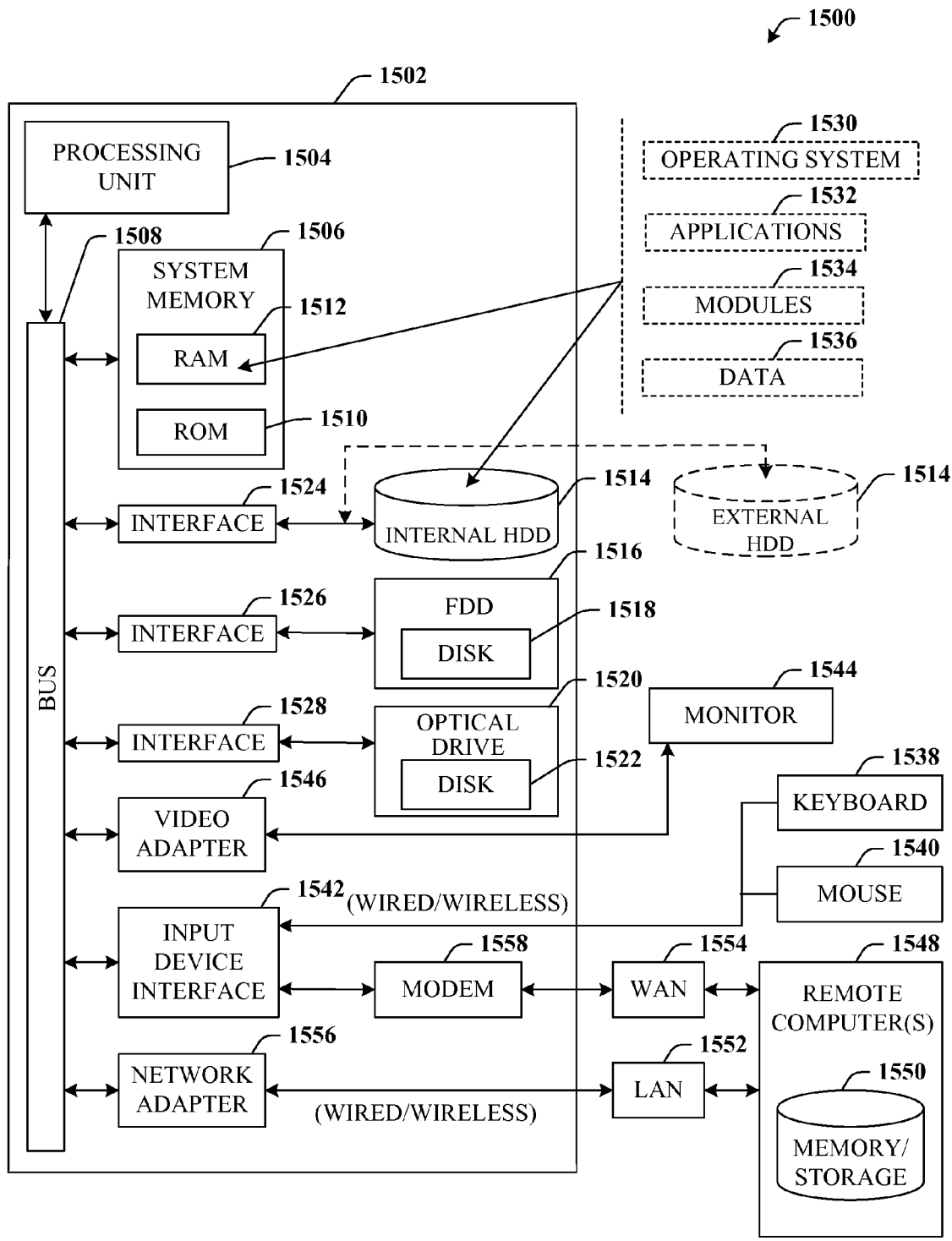
FIG. 15 is a block diagram of a computing system in which various aspects described herein can function.

In order to provide additional context for various aspects described herein, FIG. 15 and the following discussion are intended to provide a brief, general description of a suitable computing environment 1500 in which various aspects of the claimed subject matter can be implemented. Additionally, while the above features have been described above in the general context of computer-executable instructions that may run on one or more computers, those skilled in the art will recognize that said features can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, an exemplary environment 1500 for implementing various aspects described herein includes a computer 1502, the computer 1502 including a processing unit 1504, a system memory 1506 and a system bus 1508. The system bus 1508 couples to system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g. to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the claimed subject matter can be implemented with various commercially available operating systems or combinations of operating systems.

A user can enter commands and information into the computer 1502 through one or more wired/wireless input devices, e.g. a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, a serial port, an IEEE-1394 port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adapter 1556 may facilitate wired or wireless communication to the LAN 1552, which may also include a wireless access point disposed thereon for communicating with the wireless adapter 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

Figure 16:
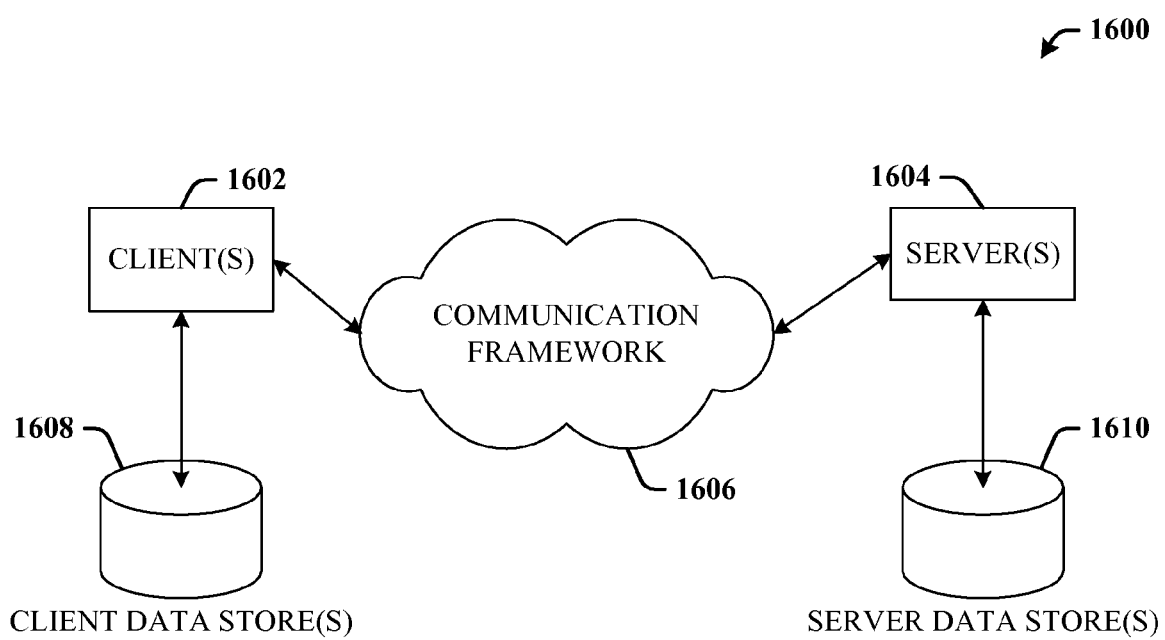
FIG. 16 illustrates a schematic block diagram of an exemplary computing environment.

Referring now to FIG. 16, there is illustrated a schematic block diagram of an exemplary computer compilation system operable to execute the disclosed architecture. The system 1600 includes one or more client(s) 1602. The client(s) 1602 can be hardware and/or software (e.g. threads, processes, computing devices). In one example, the client(s) 1602 can house cookie(s) and/or associated contextual information by employing one or more features described herein.

The system 1600 also includes one or more server(s) 1604. The server(s) 1604 can also be hardware and/or software (e.g., threads, processes, computing devices). In one example, the servers 1604 can house threads to perform transformations by employing one or more features described herein. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g. a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the described aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
a memory system;
a thread analysis component configured to analyze one or more threads requesting access to the memory system based on an effect of at least one of memory bandwidth, latency, or bank parallelism on performance of the memory system, the analysis being configured to determine or estimate at least
a first value representing a stall time for one of the one or more threads due to sharing the memory system with one or more other threads, and
a second value representing a stall time for the one thread in an absence of other threads sharing the memory system;
a thread prioritization component configured to apply a stall-time fairness policy to prioritize requests from the one or more threads based at least in part on an analysis of the one or more threads by the thread analysis component; and
a scheduling component configured to compute a memory slow-down value for the one thread based on a ratio of the first value to the second value.

2. The system of claim 1, the fairness policy being configured by one or more of a software component or a hardware component and communicated to the thread prioritization component.

3. The system of claim 1, the thread analysis component being configured to measure stall time unfairness among the one or more threads, and the thread prioritization component being configured to prioritize requests from the one or more threads based on a maximum tolerable amount of unfairness configured by one or more of a software component or the thread prioritization component.

4. The system of claim 3, wherein the scheduling component determines stall time unfairness by:
determining threads having a highest slowdown ($S_{max}$) and threads having a lowest slowdown ($S_{min}$) from among all threads that have at least one ready request; and
comparing $S_{max}/S_{min}$ to the maximum tolerable amount of unfairness to determine when $S_{max}/S_{min}$ exceeds the maximum tolerable amount of unfairness.

5. The system of claim 4, wherein, when $S_{max}/S_{min}$ does not exceeds the maximum tolerable amount of unfairness, the scheduling component schedules requests based on first-ready-first come-first serve FR-FCFS priority rules and
wherein, when $S_{max}/S_{min}$ exceeds the maximum tolerable amount of unfairness, the scheduling component prioritizes requests of a thread $T_{max}$ having a largest slowdown $S_{max}$.

6. The system of claim 1, the thread prioritization component being further configured to prioritize requests from the one or more threads based on respective weights configured by one or more of a software component or the thread prioritization component for the one or more threads.

7. The system of claim 1, the thread prioritization component being further configured to prioritize the requests based at least in part on relative memory slow-down values of the one or more threads.

8. The system of claim 1, the thread prioritization component being further configured to enforce a maximum number of memory row-hit requests that can be serviced to a memory bank while an older non-row-hit request is outstanding to the memory bank.

9. A method comprising scheduling threads in a memory system by operations including:
- analyzing one or more threads that request access to the memory system based on an effect of at least one of memory bandwidth, latency, and bank parallelism on performance of the memory system;
- based on the analyzing, determining or estimating at least two values with respect to the one or more threads, the at least two values including a value representing a stall time experienced by a thread using the memory system without one or more other threads contending for the memory system, and a value representing a stall time experienced by the thread while sharing the memory system with one or more threads;
- applying a stall-time fairness policy to prioritize requests from the one or more threads based at least in part on the analyzing of the one or more threads; and
- computing a memory slow-down value for one of the threads based on a ratio of the value representing a stall time experienced by a thread using the memory system without one or more other threads contending for the memory system to the value representing a stall time experienced by the one thread while sharing the memory system with one or more threads.

10. The method of claim 9, further comprising receiving the fairness policy from one or more of a software component or a hardware component.

11. The method of claim 9, the analyzing including measuring stall time unfairness among the one or more threads and the prioritizing including:
- identifying a maximum tolerable amount of unfairness as configured by one or more of a software component or a hardware component, and
- prioritizing requests from the one or more threads based on the maximum tolerable amount of unfairness.

12. The method of claim 9, the prioritizing including prioritizing requests from the one or more threads based on respective weights for the one or more threads.

13. The method of claim 12, the prioritizing further including obtaining the respective weights from one or more of a software component or a hardware component.

14. The method of claim 9, further comprising prioritizing a request for a thread having a highest memory slow-down value.

15. The method of claim 9, further comprising estimating an interference value representing an extra stall time experienced by the thread due to requests from the one or more other threads being serviced ahead of requests for the thread.

16. The method of claim 9, the prioritizing including enforcing a maximum number of row-hit requests that can be serviced to a memory bank while an older non-row-hit request is outstanding to the memory bank.

17. The method of claim 16, further comprising configuring the maximum number of row-hit requests using one or more of a software component or a hardware component.

18. A computer-readable storage medium having stored thereon computer-executable instructions operable to perform the method of claim 9.

19. A computer-readable storage medium storing instructions executable by at least one computing device, the instructions in response to execution performing operations including:
- analyzing respective threads that request access to a memory system based on an effect of at least one of memory bandwidth, latency, and bank parallelism on performance of the memory system;
- based on the analyzing, estimating
  - a $T_{shared}$ value for at least one of the respective threads, the $T_{shared}$ value representing a memory-related stall time experienced by the at least one of the respective threads when running in the memory system along with one or more other threads, and
  - a $T_{alone}$ value for the at least one of the respective threads, the $T_{alone}$ value representing a memory-related stall time experienced by the at least one of the respective threads if running alone in the memory system; and
- prioritizing requests from respective threads based on the analysis of the respective threads at least in part by applying a stall time fairness policy that takes into account a ratio of the $T_{shared}$ value to the $T_{alone}$ value.

* * * * *